(12) United States Patent
Spielthenner

(10) Patent No.: US 8,639,695 B1
(45) Date of Patent: Jan. 28, 2014

(54) SYSTEM, METHOD AND COMPUTER PROGRAM FOR ANALYSING AND VISUALISING DATA

(75) Inventor: Doris Spielthenner, St. Kilda (AU)

(73) Assignee: Patent Analytics Holding Pty Ltd, St. Kilda, Victoria (AU)

( * ) Notice: Subject to any disclaimer, the term of this patent is extended or adjusted under 35 U.S.C. 154(b) by 0 days.

(21) Appl. No.: 13/179,437

(22) Filed: Jul. 8, 2011

Related U.S. Application Data

(60) Provisional application No. 61/362,535, filed on Jul. 8, 2010.

(51) Int. Cl.
*G06F 7/00* (2006.01)
*G06F 17/30* (2006.01)

(52) U.S. Cl.
USPC .......................................................... 707/737

(58) Field of Classification Search
USPC .......................................................... 707/748
See application file for complete search history.

(56) References Cited

U.S. PATENT DOCUMENTS

| | | | |
|---|---|---|---|
| 5,519,608 A * | 5/1996 | Kupiec | 704/9 |
| 5,721,910 A | 2/1998 | Unger et al. | |
| 5,832,476 A | 11/1998 | Tada et al. | |
| 5,991,751 A | 11/1999 | Rivette et al. | |
| 6,038,574 A | 3/2000 | Pitkow et al. | |
| 6,112,202 A | 8/2000 | Kleinberg | |
| 6,182,091 B1 | 1/2001 | Pitkow et al. | |
| 6,285,999 B1 | 9/2001 | Page | |
| 6,339,767 B1 | 1/2002 | Rivette et al. | |
| 6,389,418 B1 | 5/2002 | Boyack et al. | |
| 6,457,028 B1 | 9/2002 | Pitkow et al. | |
| 6,499,026 B1 | 12/2002 | Rivette et al. | |
| 6,604,114 B1 | 8/2003 | Toong et al. | |
| 6,725,259 B1 | 4/2004 | Bharat | |
| 6,754,873 B1 | 6/2004 | Law et al. | |
| 7,194,691 B1 * | 3/2007 | Zilka et al. | 715/739 |
| 7,251,643 B2 | 7/2007 | Gange et al. | |
| 7,433,884 B2 | 10/2008 | Breitzman | |
| 7,454,428 B2 | 11/2008 | Wang et al. | |
| 7,493,320 B2 * | 2/2009 | Canright et al. | 1/1 |
| 7,610,367 B2 | 10/2009 | Canright et al. | |
| 7,634,716 B1 | 12/2009 | Law et al. | |
| 7,668,822 B2 | 2/2010 | Kaul et al. | |
| 7,672,950 B2 | 3/2010 | Eckardt, III et al. | |
| 7,716,226 B2 | 5/2010 | Barney | |

(Continued)

OTHER PUBLICATIONS

Kessler, M. M., "Bibliographic Coupling Between Scientific Papers," American Documentation, Jan. 1963, pp. 10-25, vol. 14, Issue 1, American Documentation Institute, Washington, D.C.

(Continued)

*Primary Examiner* — Robert Beausoliel
*Assistant Examiner* — Nicholas Allen
(74) *Attorney, Agent, or Firm* — Alston & Bird LLP

(57) ABSTRACT

A method for identifying clusters within a network including a plurality of nodes and links, comprising the steps of:
  determining a link value for each node in the network;
  determining a local maxima within the network by locating node values where the sum of link values are higher than the sum of link values for all adjacent nodes;
  determining a list of the shortest pathways between a local maximum and all other nodes in the network;
  collapsing the pathways in accordance with a predetermined algorithm; and
  associating all nodes that remain connected to each local maximum along the pathways.

13 Claims, 17 Drawing Sheets

(56) References Cited

U.S. PATENT DOCUMENTS

| | | | |
|---|---|---|---|
| 7,768,942 B2 | 8/2010 | Young et al. | |
| 7,797,336 B2 | 9/2010 | Blair et al. | |
| 7,797,344 B2 | 9/2010 | Kaul et al. | |
| 7,949,728 B2 | 5/2011 | Rivette et al. | |
| 2003/0046307 A1* | 3/2003 | Rivette et al. | 707/104.1 |
| 2003/0172020 A1 | 9/2003 | Davies et al. | |
| 2003/0228890 A1* | 12/2003 | Falaki | 455/574 |
| 2004/0083117 A1 | 4/2004 | Kim et al. | |
| 2004/0122841 A1 | 6/2004 | Goodman et al. | |
| 2004/0123245 A1 | 6/2004 | Bianchi et al. | |
| 2004/0133433 A1 | 7/2004 | Lee et al. | |
| 2005/0010559 A1 | 1/2005 | Du et al. | |
| 2005/0060287 A1* | 3/2005 | Hellman et al. | 707/2 |
| 2005/0060303 A1 | 3/2005 | Wu et al. | |
| 2005/0097093 A1* | 5/2005 | Clarkson | 707/3 |
| 2005/0154690 A1 | 7/2005 | Nitta et al. | |
| 2005/0165766 A1* | 7/2005 | Szabo | 707/3 |
| 2005/0182755 A1 | 8/2005 | Tran | |
| 2005/0210009 A1 | 9/2005 | Tran | |
| 2006/0069679 A1 | 3/2006 | Percey et al. | |
| 2006/0101048 A1* | 5/2006 | Mazzagatti et al. | 707/101 |
| 2006/0106847 A1* | 5/2006 | Eckardt et al. | 707/101 |
| 2006/0225000 A1 | 10/2006 | Albrecht et al. | |
| 2007/0073625 A1 | 3/2007 | Shelton | |
| 2007/0208772 A1 | 9/2007 | Harik et al. | |
| 2008/0068401 A1 | 3/2008 | Albrecht et al. | |
| 2008/0134060 A1 | 6/2008 | Albrecht et al. | |
| 2009/0070297 A1* | 3/2009 | Hadzima et al. | 707/3 |
| 2009/0070301 A1 | 3/2009 | McLean et al. | |
| 2009/0089248 A1 | 4/2009 | Alexander et al. | |
| 2009/0164404 A1 | 6/2009 | Sampath et al. | |
| 2010/0030734 A1* | 2/2010 | Chunilal | 707/3 |
| 2010/0077007 A1 | 3/2010 | White et al. | |
| 2010/0094910 A1 | 4/2010 | Bayliss | |
| 2010/0106752 A1 | 4/2010 | Eckardt, III et al. | |
| 2010/0114862 A1 | 5/2010 | Young et al. | |
| 2010/0174698 A1 | 7/2010 | Odland et al. | |
| 2010/0180223 A1* | 7/2010 | Speier | 715/771 |
| 2010/0205541 A1* | 8/2010 | Rapaport et al. | 715/753 |
| 2010/0241580 A1* | 9/2010 | Schleier-Smith | 705/319 |
| 2010/0287478 A1 | 11/2010 | Avasarala et al. | |
| 2010/0325082 A1 | 12/2010 | Helms, II et al. | |
| 2011/0072024 A1 | 3/2011 | Barney | |
| 2011/0179037 A1* | 7/2011 | Mizuguchi et al. | 707/740 |
| 2011/0191277 A1* | 8/2011 | Ag ndez Dominguez et al. | 706/12 |
| 2011/0274106 A1 | 11/2011 | Suginaka et al. | |
| 2012/0011132 A1* | 1/2012 | Spielthenner | 707/750 |
| 2012/0023145 A1* | 1/2012 | Brannon et al. | 707/822 |

OTHER PUBLICATIONS

Kessler, M. M., "An Experimental Study of Bibliographic Coupling Between Technical Papers," IEEE Transactions on Informational Theory, Jan. 1963, pp. 49-51, IEEE, New York.

Bichteler, Julie, et al., "The Combined Use of Bibliographic Coupling and Cocitation for Document Retrieval," Journal of the American Society for Information Science, Jul. 1980, pp. 278-282, vol. 31, Issue 4, John Wiley & Sons, Inc., Hoboken.

Cawkell, A. E., "Correspondence: Science Citation Index," Nature, Nov. 21, 1970, pp. 789-790, vol. 228, Nature Publishing Group, U.K.

Small, Henry, et al., "The Structure of Scientific Literatures, I: Identifying and Graphing Specialties," Science Studies, Jan. 1974, pp. 17-40, vol. 4, Issue 1, Sage Publications, Ltd., U.K.

Griffith, Belver C., et al., "The Structure of Scientific Literatures, II: Toward A Macro- and Microstructure for Science," Science Studies, Jan. 1974, pp. 339-365, vol. 4, Issue 1, Sage Publications, Ltd., U.K.

Price, Nancy, et al., "A Clustering Experiment: First Step Towards A Computer-Generated Classification Scheme," Inf. Stor. Retr., Aug. 1968, vol. 4, No. 3, pp. 271-280, Pergamon Press, Great Britain.

Garfield, Eugene, "Announcing the SCI Compact Disc Edition: CD-ROM Gigabyte Storage Technology, Novel Software, and Bibliographic Coupling Make Desktop Research and Discovery a Reality," Essays of an Information Scientist: Science Literacy, Policy, Evaluation, and Other Essays, May 30, 1988, pp. 160-170, vol. 11, Current Contents, No. 22, pp. 3-13, USA.

Small, Henry G., et al., "Journal Clustering Using a Bibliographic Coupling Method," Information Processing & Management, Apr. 1977, pp. 277-288, vol. 13, Pergamon Press, Great Britain.

Sharabchiev, J. T., "Cluster Analysis of Bibliographic References as a Scientometric Method," Scientometrics, 1989, pp. 127-137, vol. 15, Nos. 1-2, Published Jointly by Elsevier, Oxford, and Akadëmiai Kiadó, Budapest.

Kochtanek, Thomas R., "Bibliographic Compilation Using Reference and Citation Links," Information Processing & Management, 1982, pp. 33-39, vol. 18, No. 1, Pergamon Press Ltd, Great Britian.

Jahiel, Rene I., et al., "Targeted Citation Studies: An Alternative to Co-Citation Analysis for the Mapping of Scientific Fields," Proceedings of the 44th ASIS Annual Meeting, Oct. 1981, pp. 288-290, vol. 18, Knowledge Industry Publications, Inc., White Plains.

Vlaudtz, G., et al., "Bibliographic Coupling and Subject Relatedness," Proceedings of the 47th ASIS Annual Meeting, Oct. 1984, pp. 204-207, vol. 21, Knowledge Industry Publications, Inc., White Plains.

Konski, Antoinette F., et al., "Stem Cell Patents: A Landscape Analysis," Nature Biotechnology, Aug. 2009, pp. 722-726, vol. 27, No. 8, Nature Publishing Group, U.K.

Strandburg, Katherine, J., et al., "Law and The Science of Networks: An Overview and an Application to The 'Patent Explosion'," Berkeley Technology Law Journal, Fall 2006, pp. 1293-1362, vol. 21, No. 4, Berkeley Technology Law Journal, Berkeley.

Érdi, Péter, et al., "Prediction of Emerging Technologies Based on Analysis of the U.S. Patent Citation Network," Scientometrics, Jun. 2012, pp. 1-21, Akadémiai Kiadó co-published with Springer Science+Business Media B.V., Formerly Kluwer Academic Publishers B.V., Budapest.

United States Patent and Trademark Office, Office Action for U.S. Appl. No. 13/179,439, dated Sep. 19, 2012, 17 pages, USA.

United States Patent and Trademark Office, Office Action for U.S. Appl. No. 13/179,439, dated Mar. 20, 2013, 25 pages, USA.

\* cited by examiner

SYSTEM, METHOD AND COMPUTER PROGRAM FOR ANALYSING AND VISUALISING DATA

CROSS REFERENCE TO RELATED APPLICATIONS

This nonprovisional application claims priority to U.S. Provisional Application No. 61/362,535, filed Jul. 8, 2010, which is hereby incorporated by reference in its entirety.

FIELD OF THE INVENTION

The present invention relates to a system, method and computer program for analysing and visualising data. Embodiments of the invention find particular, but not exclusive use in the analysis and visualisation of patent data.

BACKGROUND OF THE INVENTION

With the advent of cheap and powerful computing systems and the development of the electronic database, there has been an explosion in the collection of data across almost all areas of technology and society. Data is generally held, in many instances, in the form of a "record", which typically comprises a series of attributes that describe a real world object or event. For example, one type of data record is a health and physical record, which holds information regarding the attributes of a given person, such as their height, gender, weight, existing and past medical conditions, etc.

Another structured set of data is data regarding intellectual property rights, such as patent data records or trade mark data records. Many countries and jurisdictions have sophisticated legal regimes where owners or creators of intellectual property can register their rights to an invention, a sign and/or a design. Such records are highly structured and include a large number of attributes, such as a date of filing, the name of the Owner or Applicant, the names of the Inventors, data regarding the history of the invention and particular intellectual property office classification codes, such as the IPC (International Patent Classification) code.

As patent data is effectively a record of innovative activity, value can be derived by searching patent data to extract commercially useful information.

However, as an ever growing number of patents are filed every year, due to a constant increase in the rate of technological development and a greater awareness of the legal rights covering inventions, patent databases now contain millions or tens of millions of records, and each record has a complex set of attributes. Therefore, traditional methods for searching such databases (such as by looking for keywords in the Title, Abstract or Applicant Details) lack precision, are prone to error and can return large and unwieldy data sets.

More importantly, without seeking professional assistance and studying each patent specification in detail, it is difficult to judge the relative worth or "merit" of a particular patent, or the underlying invention protected by the patent, in comparison to other patents and patented inventions. As such, traditional search methodologies struggle to adequately provide any sophisticated or high level information regarding the relative merit or worth of a patent.

In the context of the following description, it will be understood that a data set refers to a collection of one or more data records extracted from a database. In turn, a data record includes a number of attributes. The attributes define and quantify a number of characteristics about a "real world" entity. For example, in the case of patent data records, one attribute may be the patent number, another attribute may be the named Applicant or Patentee, a third attribute may be a list of documents cited against the patent during examination, etc. In turn, an attribute value is the actual value contained in a particular instance of a data record. For example, in a patent data record, an attribute is the patent number, and the attribute value, for a given record, is the actual value stored for that attribute.

SUMMARY OF THE INVENTION

In a first aspect, the present invention provides a method for identifying clusters within a network including a plurality of nodes and links, comprising the steps of:

determining a link value for each node in the network;

determining a local maxima within the network by locating node values where the sum of link values are higher than the sum of link values for all adjacent nodes;

determining a list of the shortest pathways between a local maximum and all other nodes in the network;

collapsing the pathways in accordance with a predetermined algorithm; and associating all nodes that remain connected to each local maximum along the pathways.

The link value may be derived by determining the number of second degree of separation links between each node and each other node.

The predetermined algorithm may collapse the pathways where the rate of change of link values is greater than a predetermined value.

In another embodiment, the predetermined algorithm may collapse the pathways where the link value is smaller than a predetermined value.

In a second aspect, the present invention provides a method for determining the relative ranking of each of a plurality of linked data records, comprising the steps of:

determining the shortest pathway between each of the data records;

determining the number of times each of the data records appears in this list of the shortest pathways; and assigning a ranking to each of the data records based on the number of times the record appears in the list of shortest pathways.

In a third aspect, the present invention provides a method for determining the relative ranking of each of a plurality of linked data records, comprising the steps of:

determining all entry data records that have no backward citations;

determining all exit data records by locating all data records which have no forward citations;

determining a list of the shortest pathway between each one of the entry data records and each one of the data exit records;

determining the number of times each of the entry and exit data records appear in the list of the shortest pathways; and assigning a ranking to each of the data records based on the number of times the record appears in the list of shortest pathways between the entry data records and the exit data records.

The method of the third aspect may further comprise compiling a list of data records; and the records within the list may be ordered from the highest pathway value to the lowest pathway value.

The record may be assigned a sequential integer value based on the pathway value, wherein the record with the highest pathway value may be assigned an integer value of one.

Moreover, the pathway value may be normalised or weighted.

The third aspect may also comprise the further steps of determining the relative ranking utilising one or more of the methods in accordance with a first, second and third aspect to determine an overall ranking of the data records.

In a fourth aspect, the present invention provides a method for determining the relative ranking of a group of data records in a plurality of groups of data records within a network of data records, comprising the steps of:

for each group of data records, combining all links between each data record in each group of data records to create a meta data record;

determining the number of self referential links within each meta data records;

forming a network based on the combined links of each meta data records;

defining the shortest pathway between each of the meta data records to create a list of pathways;

counting the number of times each meta data record appears in the list of pathways to determine a path ranking; and ranking the meta data records according to the path ranking.

In a fifth aspect, the present invention provides a method for determining the probability of a data record being associated with another data record, comprising the steps of:

determining the length of the shortest pathway value and the number of unique pathways of the shortest length between the two data records;

dividing the shortest pathway length by the number of unique pathways to determine a pathway value, wherein the pathway value is an indicator of the similarity between the selected data record and the at least one other data record.

In a sixth aspect, the present invention provides a method for determining an averaged attribute value for a set of data records which have been ascribed a rank, comprising the steps of:

ascribing a reverse rank value to each of the data records, the reverse rank value being equal to the number of records in the data set minus the rank value of the data record;

selecting one or more attributes of the data record;

extracting the selected attributes;

combining the selected attributes, combining the selected attributes with the reverse rank value for each data record; and displaying the resultant values to determine the highest ranked values.

In a seventh aspect, the present invention provides a system for identifying clusters within a network including a plurality of nodes and links, comprising:

a processor arranged to determine a link value for each node in the network;

determine a local maxima within the network by locating node values where the sum of link values are higher than the sum of link values for all adjacent nodes;

determine a list of the shortest pathways between a local maximum and all other nodes in the network;

collapse the pathways in accordance with a predetermined algorithm; and associate all nodes that remain connected to each local maximum along the pathways.

In an eighth aspect, the present invention provides a system for determining the relative ranking of each of a plurality of linked data records, comprising:

a processor arranged to determine the shortest pathway between each of the data records;

determine the number of times each of the data records appears in this list of the shortest pathways; and assign a ranking to each of the data records based on the number of times the record appears in the list of shortest pathways.

In a ninth aspect, the present invention provides a system for determining the relative ranking of each of a plurality of linked data records, comprising:

a processor arranged to determine all entry data records that have no backward citations;

determine all exit data records by locating all data records which have no forward citations;

determine a list of the shortest pathway between each one of the entry data records and each one of the data exit records;

determine the number of times each of the entry and exit data records appear in the list of the shortest pathways; and assign a ranking to each of the data records based on the number of times the record appears in the list of shortest pathways between the entry data records and the exit data records.

In a tenth aspect, the present invention provides a system for determining the relative ranking of a group of data records in a plurality of groups of data records within a network of data records, comprising:

a processor arranged to, for each group of data records, combine all links between each data record in each group of data records to create a meta data record;

determine the number of self referential links within each meta data records;

form a network based on the combined links of each meta data records;

define the shortest pathway between each of the meta data records to create a list of pathways;

count the number of times each meta data record appears in the list of pathways to determine a path ranking; and rank the meta data records according to the path ranking.

In an eleventh aspect, the present invention provides a system for determining the probability of a data record being associated with another data record, comprising:

a processor arranged to determine the length of the shortest pathway value and the number of unique pathways of the shortest length between the two data records; and divide the shortest pathway length by the number of unique pathways to determine a pathway value, wherein the pathway value is an indicator of the similarity between the selected data record and the at least one other data record.

In a twelfth aspect, the present invention provides a system for determining an averaged attribute value for a set of data records which have been ascribed a rank, comprising:

a processor arranged to ascribe a reverse rank value to each of the data records, the reverse rank value being equal to the number of records in the data set minus the rank value of the data record;

select one or more attributes of the data record;

extract the selected attributes;

combine the selected attributes, combining the selected attributes with the reverse rank value for each data record; and display the resultant values to determine the highest ranked values.

In a thirteenth aspect, the present invention provides a computer program, including at least one instruction, which, when executed on a computing system, is arranged to implement a method in accordance with any one of the first to fourth aspects.

In a fourteenth aspect, the present invention provides a computer readable media including a computer program in accordance with the thirteenth aspect of the invention.

In a fifteenth aspect, the present invention provides transmitting or receiving a computer data signal comprising at least one encoded instruction in accordance with the thirteenth aspect of the invention.

DETAILED DESCRIPTION OF THE DRAWINGS

Notwithstanding any other embodiments that may fall within the scope of the present invention, an embodiment of the present invention will now be described, by way of example only, with reference to the accompanying figures, in which:

FIG. 1 is an example computing device utilizable to carry out a methodology in accordance with an embodiment of the invention;

FIG. 2*a* is a flowchart depicting the process flow of a method in accordance with an embodiment of the present invention and FIG. 2*b* is an example network illustrating the application of the method in accordance with the process flow of FIG. 2*a*;

DETAILED DESCRIPTION OF AN EMBODIMENT

The foregoing describes only a preferred embodiment of the present invention and modifications, obvious to those skilled in the art, can be made thereto without departing from the scope of the present invention.

Figure 1:
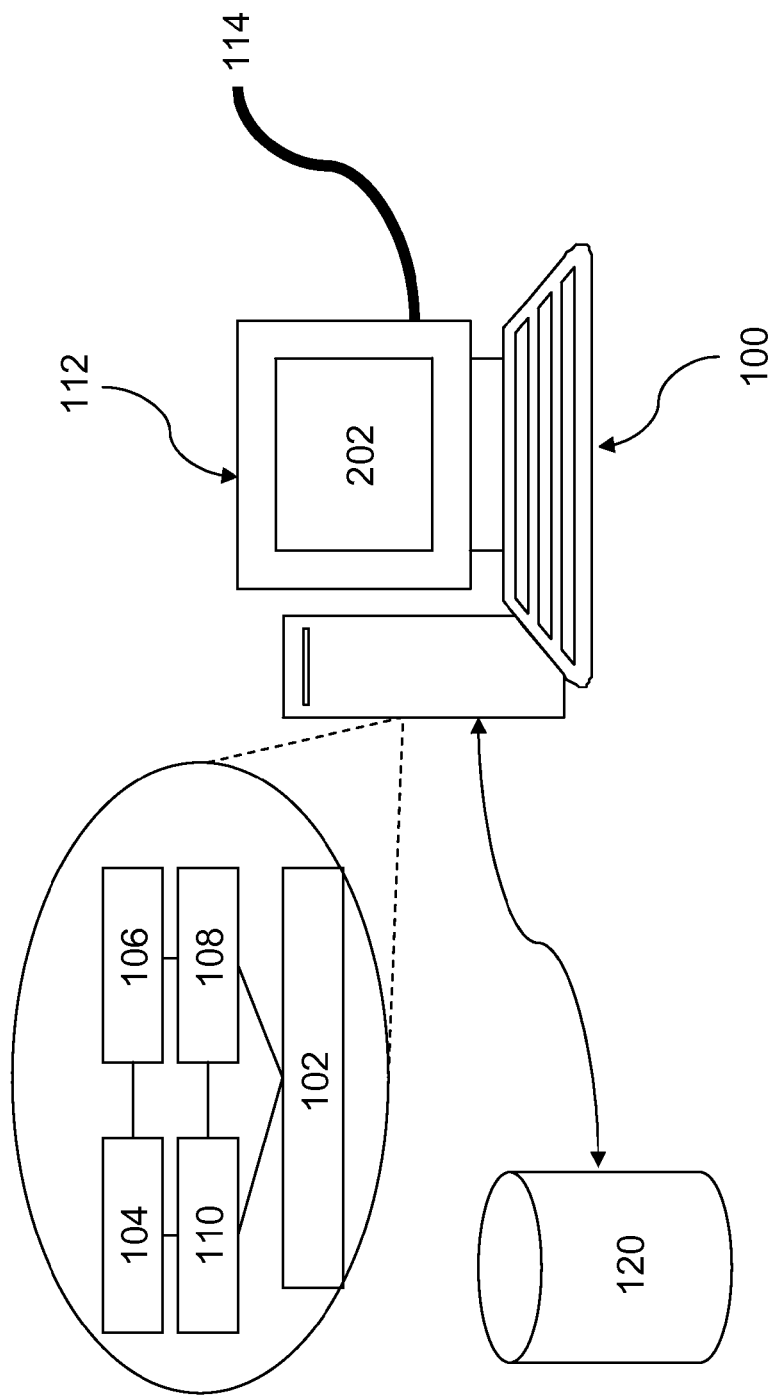

Referring to FIG. 1, an embodiment of the present invention is illustrated. This embodiment is arranged to provide a system for analysing and visualising data, comprising an interface for receiving user instructions and displaying information, and a processor for executing user commands, including commands to collect data in a suitable manner for further processing. In this example embodiment, the interface and processor are implemented by a computer having an appropriate user interface. The computer may be implemented by any computing architecture, including stand-alone PC, client/server architecture, "dumb" terminal/mainframe architecture, or any other appropriate architecture. The computing device is appropriately programmed to implement the embodiment described herein.

In this embodiment, there is provided a local database containing a set of records, such as patent data records. In the embodiment described herein, the records may have been selected and collated in accordance with a co-pending application filed by the Applicant, entitled "A System, Method and Computer Program for preparing data for analysis", U.S. Provisional Application No. 61/362,520, filed Jul. 8, 2010 and U.S. Nonprovisional application Ser. No. 13/179,437, filed Jul. 8, 2011, which are herein incorporated by reference. In another embodiment, it will be understood that the system may access a separately located and/or administered database containing patent data records. The database may be separately administered by a Government authority or third party.

Referring in detail to FIG. 1, there is shown a schematic diagram of a computing device which in this embodiment is a computing system 100. The system 100 comprises suitable components necessary to receive, store and execute appropriate computer instructions. The components may include a processing unit 102, read-only memory (ROM) 104, random access memory (RAM) 106, and input/output devices such as disk drives 108, input devices 110 such as an Ethernet port, a USB port, etc. Display 112 such as a liquid crystal display, a light emitting display or any other suitable display and communications links 114. The system 100 includes instructions that may be included in ROM 104, RAM 106 or disk drives 108 and may be executed by the processing unit 102. There may be provided a plurality of communication links 114 which may variously connect to one or more computing devices such as a server, personal computers, terminals, wireless or handheld computing devices. At least one of a plurality of communications link may be connected to an external computing network through a telephone line or other type of communications link.

The system may include storage devices such as a disk drive 108 which may encompass solid state drives, hard disk drives, optical drives or magnetic tape drives. The system 100 may use a single disk drive or multiple disk drives. The system 100 may also have a suitable operating system 116 which resides on the disk drive or in the ROM of the system 100.

The system has a database 120 residing on a disk or other storage device which is arranged to store at least one record 122 providing patent related data. The database 120 is in communication with an interface (comprising one or more of the abovementioned components), which is implemented by computer software residing on the system 100. The interface provides a means by which the data may be appropriately visualised, before, during and after substantive analysis.

The interface is in connection with the processor and is arranged to facilitate both the entering of user commands and the display of information to the user.

The following description provides a series of discrete techniques utilised by the system to perform a substantive analysis of large data sets. While the techniques are described as discrete components, it will be understood that the techniques may be used in conjunction to provide a rich and deep analysis of any relevant data set. The system and associated software application allow the user to apply the techniques in any suitable sequence, to provide the user with the most appropriate analysis for their particular requirements.

Before describing the techniques in detail, it is instructive to provide some definitions, so that the reader may better understand the techniques.

Firstly, the techniques which are described herein apply principally to "network" visualisations. A network visualisation is a visual map/diagram which displays a plurality of entities and the relationship between the entities. For example, a map of train stations is a good illustration of a simple network map. Each dot or "node" represents a train station and each line or "link" represents a rail connection between the two stations. By using simple graphical devices such as nodes and links, a large amount of information about an entire rail network can be conveyed in a small space, and more importantly, in a manner that is intuitively understandable to a user (e.g. a train commuter). The map/diagram may be provided in a two dimensional format, or a three dimensional format, depending on the relative complexity of the data that is being displayed.

Secondly, in the context of the embodiment described herein, patent data is visualised using a network visualisation technique. Each node represents a patent or patent application, and each link represents a common shared attribute value, such as a common citation (i.e. a backward citation or forward citation).

Lastly, it will be understood that any suitable visualisation techniques/software components may be utilised to create a visual image of the network.

With these points in mind, the various techniques utilised by the system and software application will now be described.

Automatic Identification of Clusters within a Network

It is useful for the end user to be able to identify clusters within a network. In the context of the embodiment described herein, a cluster is a plurality of nodes that are interconnected and share, as a grouping, a propensity to be more similar to each other in a certain way than data records not within the cluster. For example, when analysing patent records, a cluster of patent records may be similar in their scope of invention or subject matter. Similarly, a cluster of scientific papers may be in a closely related subject area. Generally, when a cluster is visualised (e.g. in a network diagram), the nodes that form the cluster will "bunch together". For example, where patent data is used to create a network visualisation, a cluster of patents describing inventions that are all in the same field of technology will tend to "bunch together", since they will have a high probability of sharing one or more citations. However, where there are a large number of clusters the user may not immediately be able to easily view or identify cluster, particularly where clusters overlap.

Figure 2A:
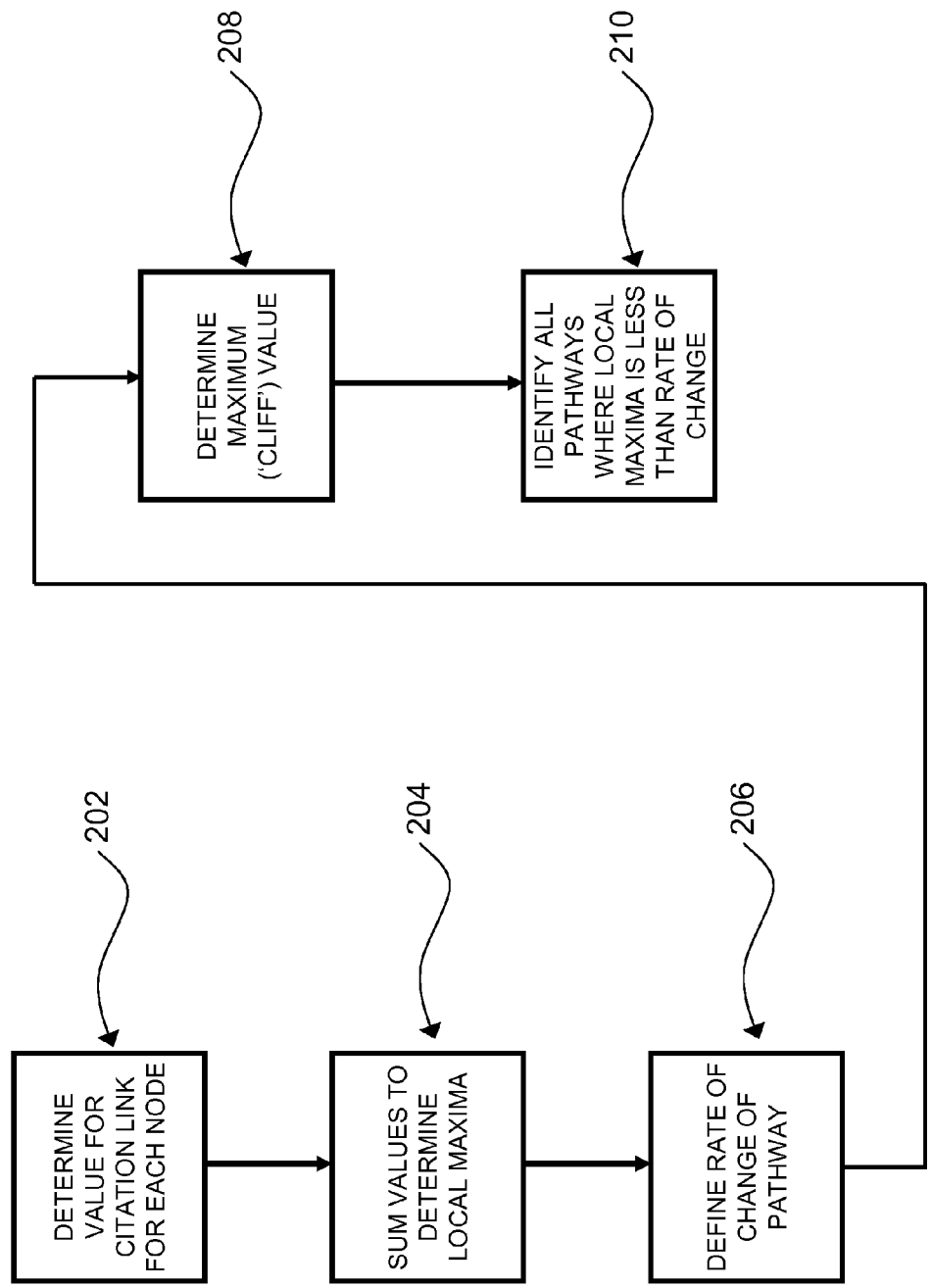

The embodiment described herein contemplates two ways to automatically identify a cluster and all its elements within a network. The first technique is referred to as the C2 embodiment. The technique presupposes that a search has been carried out, a data set identified, and an initial network created. Once these steps have been taken, then the method steps outlined in FIG. 2A are followed. Firstly, the C2 (the number of links with two degrees of separation) value for each citation link is determined at step 202. Thereafter, all the data records which are local maxima within the network, (LM1, LM2 . . . ) are defined as all the data records for which the sum of C2 values of every direct citation link to adjacent patents is equal or higher than the sum of C2 values for all directly linked, adjacent data records at step 204.

For each local maxima LMi, the rate of change in every pathway from LMi is defined at step 206. The pathway (value?) is defined as the reduction in C2 for citation link along the pathway, hereafter Delta_C2.

Thereafter, an overall or local 'cliff value' for C2 is determined, which is labelled Delta_C2_cliff at step 208.

Lastly, all data records that are connected to each local maxima LMi by a pathway in which the Delta_C2 value is less than Delta_C2_cliff at every part of this pathway are identified and each of such data records are grouped into a cluster of data records and assigned a unique identifier at step 210.

Figure 2B:
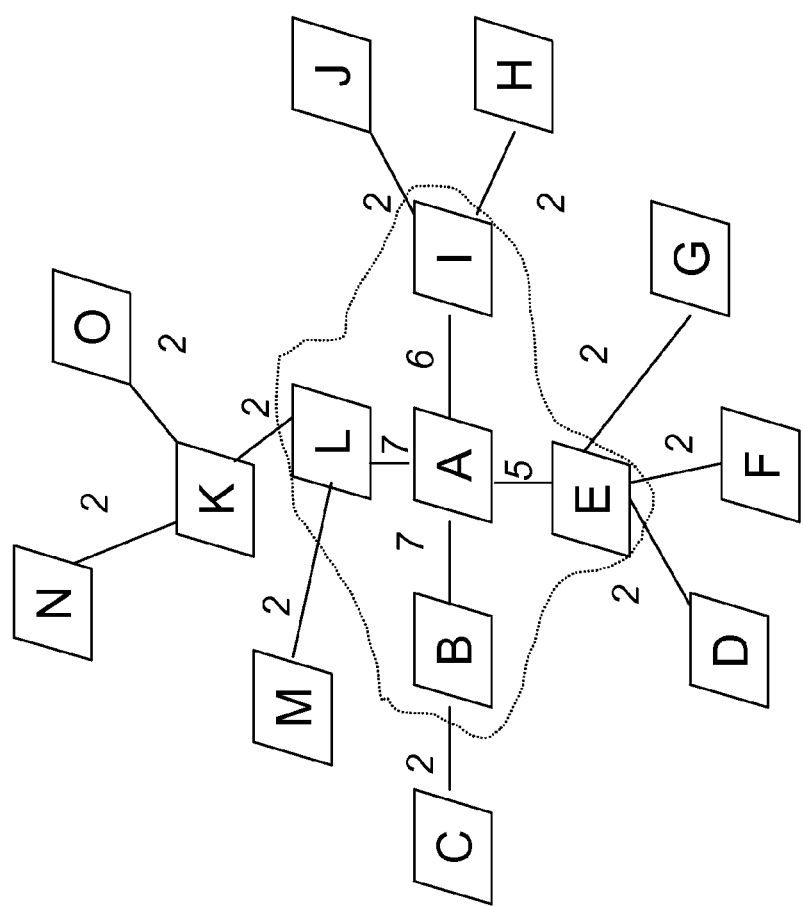

This methodology is best illustrated by reference to an example as shown in FIG. 2B. In the following subset of a network, a series of direct relationships is shown between data records A to O, and the C2 value for each citation link has been determined (shown as the numeral alongside each link in the network illustrated in FIG. 2B).

One cluster is identified in the network comprising the following data records (A, B, L, I and E). A is a local maximum because the sum of C2 values for every link between A and its (shown) adjacent data records has a summed value greater than the summed values of all other adjacent data records.

A has a summed C2 value of 25 (7+6+5+7) compared to the SummedC2 for L (2+2+7=11), the SummedC2 for 1 (2+2+6=10), the SummedC2 for E (5+2+2+2=11), and the SummedC2 for B (2+7=9).

To determine the size of the cluster around A, that is, data records that show a strong contextual relationship with A, in this case, a Delta_C2_cliff value is set at 2.

This defines the clusters as included in the dotted lines (data records A, B, L, I and E) as the delta_C2 values for the relationships between the patents and their other adjacent patents is all greater than 2 (being 5−2=3 for data record E, and so on).

Another way of expressing this concept is to imagine a series of all possible paths emanating from a defined local maximum, A in this case. These paths would include, for example, A-B-C, A-E-D, and so on. For each of these paths, say A-L-K-N say, it is possible to calculate the delta value as we move along the path, the delta value as we proceed along is this path (and ignoring the direct links from the local maximum) is for link L-K equal to 7−2=5, and for link K-N equal to 2−2=0. However the Delta_C2_cliff value is set to 2 from above, and so this pathway is 'cut' at the link from L to K, resulting in L being identified as part of the cluster, and K as not part of the cluster.

In other words, nodes associated with a particular local maximum can determined by determining the shortest possible pathway between a local maximum and all other patents in the network, determining the delta_C2 values along every link of these pathways (apart from the link immediately adjacent to the local maximum), for the purpose of defining the clusters cutting these pathways which has a delta C2 value greater than Delta_C2_cliff, and then determining which nodes remain connected to the local maximum along these pathways. These nodes, along with the local maximum, then form a clusters.

In an alternative embodiment, it will be understood that the above methodology may be utilised by replacing the C2 variable with the Mcount variable as an alternative citation strength indicator.

While there are manual techniques for identifying clusters (e.g. a user inspects a sample of patent records chosen from the cluster to determine whether a common attribute is easily discernible or the data records are otherwise similar, there are many advantages that arise from providing an automated technique.

Firstly, manual cluster identification is time consuming, and secondly, requires a certain level of expertise and/or competence. Time becomes a real factor when a network contains thousands or even millions of patents. Competence becomes a factor when the technology area is very specialised and requires in-depth knowledge to spot trends. The technique described above largely avoids the two drawbacks of manual cluster identification, and allows the efficient and automated identification of similar data records in what can be a very large data set Determine the Highest Ranking Data Records in a Network An important aspect of analysing a large data set is the ability to extract or identify individual data records that are of particular importance. In small data sets, such analysis can be carried out manually, by having a skilled person manually review the records and provide an opinion or report. With large data sets, however, manual analysis is either extremely laborious or simply impossible to undertake in a meaningful manner.

The embodiment provides a process for ranking data records in a network or cluster of inter-connected data records.

As with many of other techniques described herein, it is necessary to begin with a group of data records to be analysed. It will be assumed that an initial cluster identification technique has already been applied to the group of data records, such that appropriate clusters have already been identified. It will be understood that the identification of clusters may be achieved by utilising any suitable method, including but not limited to the methods described herein. However it is also understood that the method to be described below would also apply to any set of data records, whether these have been sorted into clusters or not.

Ranking the group of data records may then be performed using one or both of the following ranking methods.

Between-Ness Ranking

Figure 3:
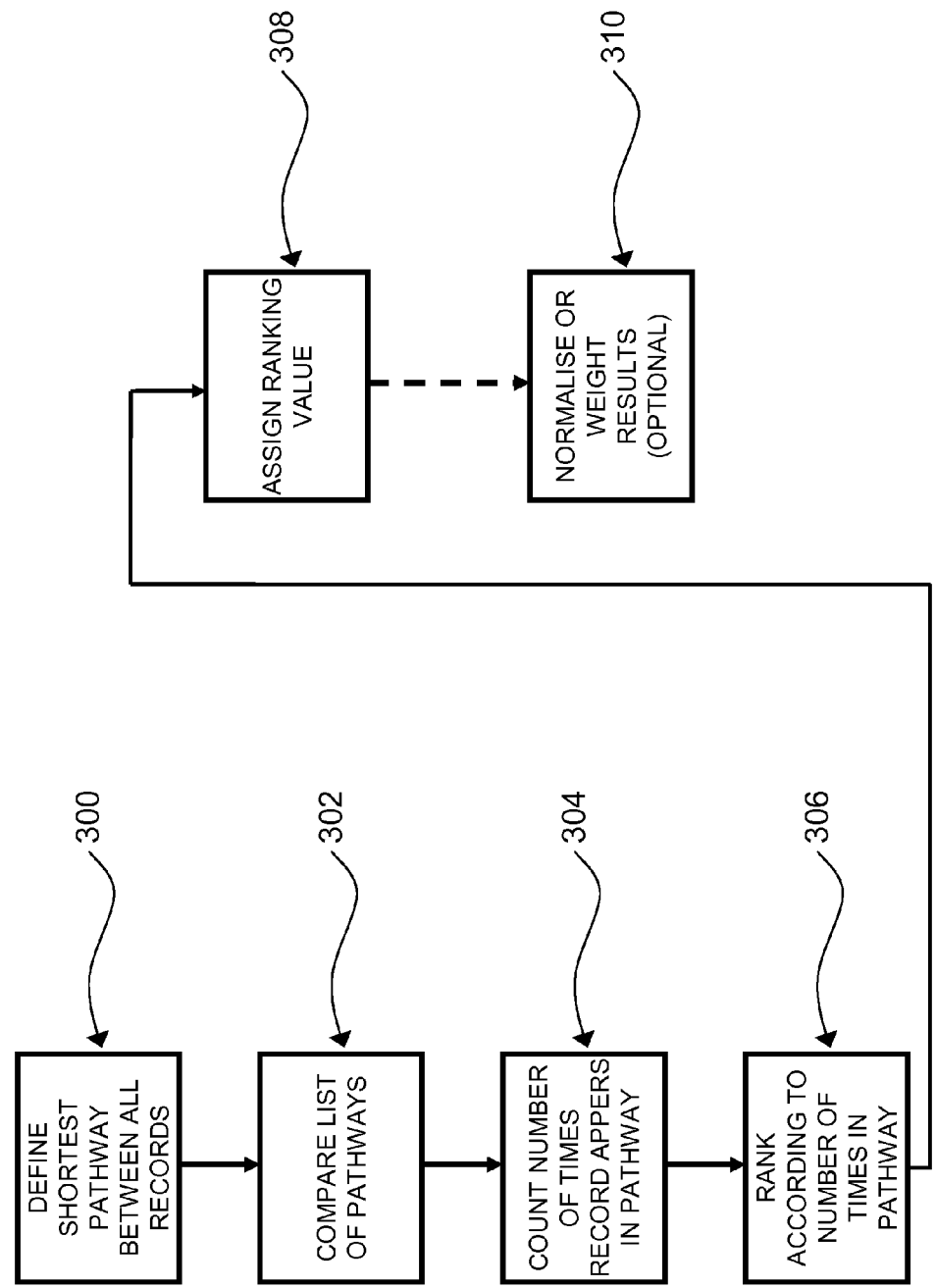
FIG. 3 is a flowchart depicting the process flow of another method in accordance with an embodiment of the present invention.

Referring to FIG. 3, there is shown a flowchart for implementing a "between-ness" ranking algorithm. At step 300, for a set of data records D1 to Dn, the shortest pathway between all pairs of data records is defined, and at 302 a list of these pathways pw1, pw2 . . . pwn is complied.

The number of times each data record appears in this list of pathways pw1 to pwn is counted (however, data records are not counted when they appear at the beginning and end of a pathway).

The set of data records are then ranked 306 according to the number of times each data record is found in the list of pathways pw1 to pwn, ranking the data records from the most counts to the least. At 308 the highest ranked data record (highest data count in pathways) is assigned the rank of 1, the second highest a rank of 2, etc. In an alternative embodiment, these weights can also be normalized or weighted, depending on other extraneous information which may be provided by an expert user (e.g. some patents may be weighted if it is known that they have been part of a successful court action for infringement, or if other information, both private or public, can be brought to the analysis) at 310.

The abovementioned methodology for determining rank is illustrated with reference to FIG. 4.

Figure 4:
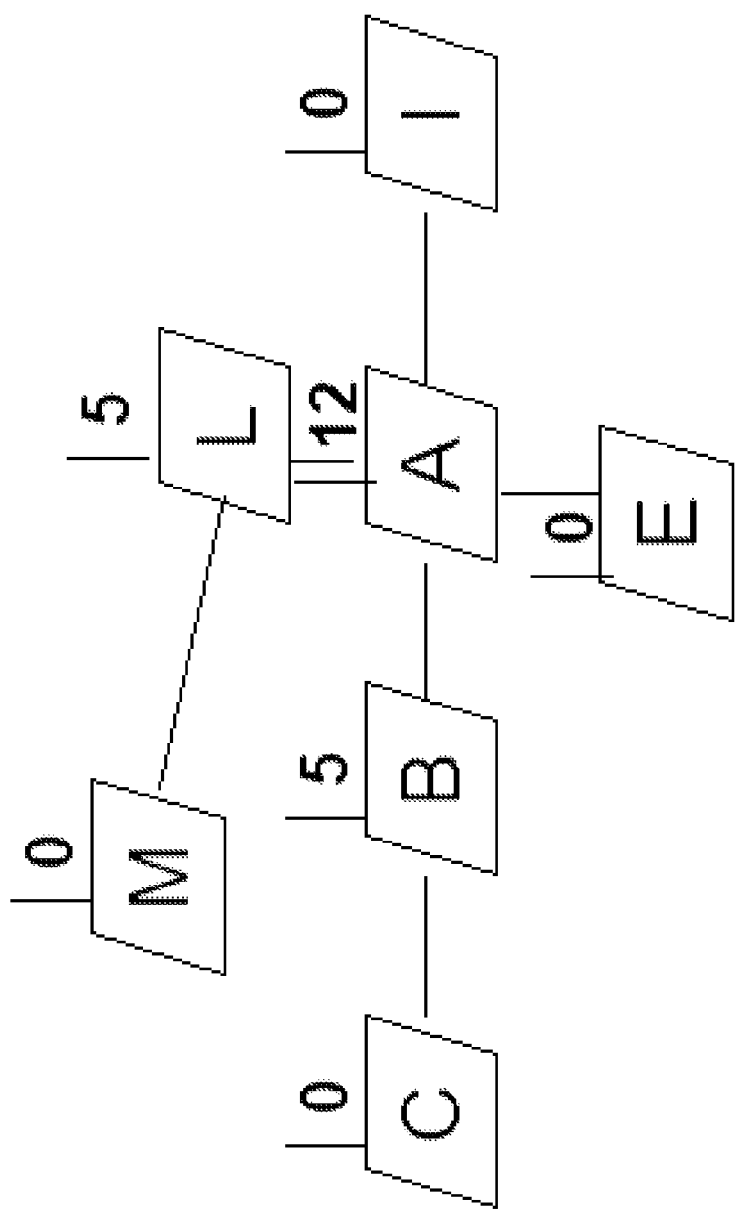
FIG. 4 is an example network illustrating the application of the method in accordance with the process flow of FIG. 3.

It is possible to compile the following a list of paths (see Table 1) between all possible data records in FIG. 4 (and ignoring paths between directly linked data records).

TABLE 1

| Path | Data Records Appearing in Paths but Not at Ends |
|---|---|
| M-L-A | L |
| M-L-A-E | L, A |
| M-L-A-I | L, A |
| M-L-A-B | L, A |
| M-L-A-B-C | L, A, B |
| C-B-A | B |
| C-B-A-I | B, A |
| C-B-A-E | B, A |
| C-B-A-L | B, A |
| L-A-E | A |
| L-A-I | A |
| L-A-B | A |
| B-A-I | A |
| B-A-E | A |

From Table 1, it is possible to count the number of times each data record appears in this list of flow records. The result is shown in Table 2.

TABLE 2

| Data Record | Number of Times it Appears in Shortest Flow Path |
|---|---|
| A | 12 |
| B | 5 |
| C | 0 |
| E | 0 |
| I | 0 |
| L | 5 |
| M | 0 |

From Tables 1 and 2, and shown in FIG. 4, rank A is the most important data record, with B and L the equal next important. While this result appears to be intuitive from this simple visual example, the use of this method allows the objective assessment of very large numbers of data records.

Flow Ranking

Figure 5:
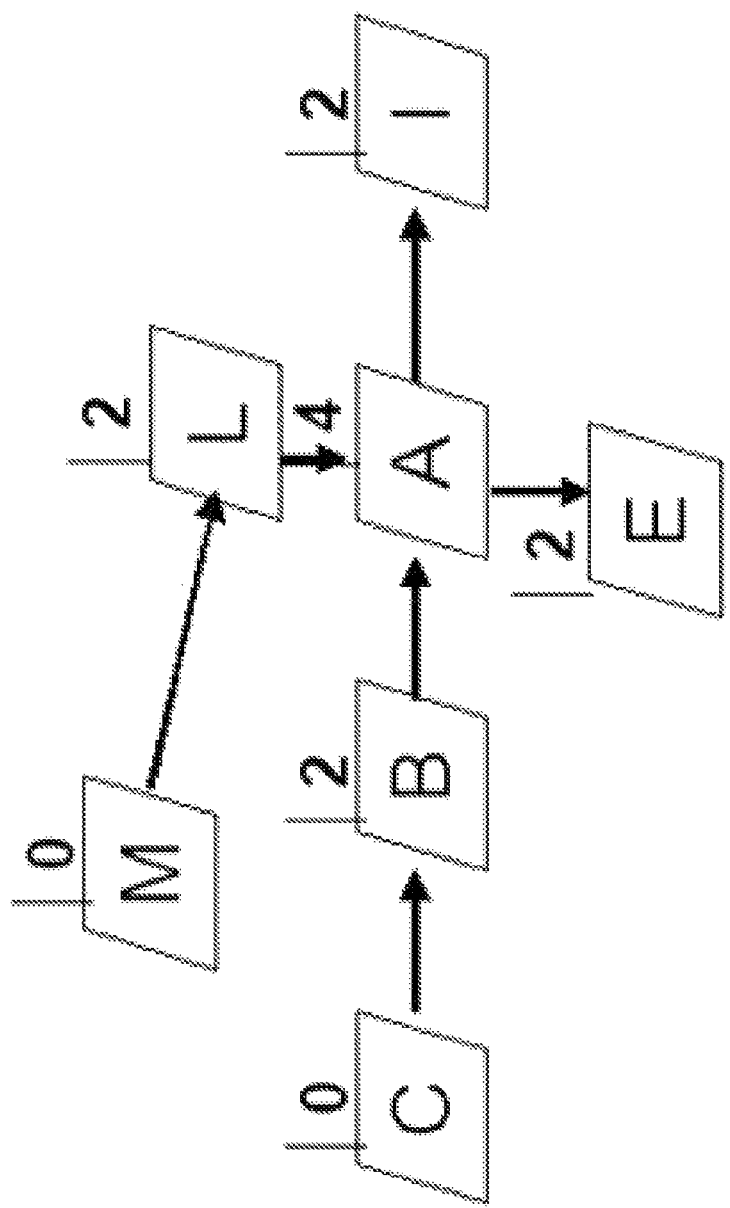
FIG. 5 is an example network illustrating the application of the method in accordance with an embodiment of the invention.

An alternative methodology for ranking records in a cluster is to utilise flow ranking as shown in FIG. 5 (Joe, I can't find FIG. 5 as you have described—FIG. 5 is there but the flow diagram for FIG. 5 is missing). For the set of data records D1 to Dn in the network (and due to previous work on the network there are no isolates, i.e. data points with no reverse citations and no forward citations) all data records where there are no backward citations are identified (referred to as 'entry' data records i1, i2 . . . in) at step 502. Similarly, all data records where there are no forward citations are identified (referred to as exit data records x1, x2 . . . xn) at step 504.

Using entry and exit data records, a list of all possible flow pathways fp1, fp2 . . . fpn between all values of I, and all values of x, where each flow pathway always flows along the lines of forward citation are determined at step 506. The number of times each data record appears in the list of flow pathways fp1, fp2 . . . fpn, is counted at step 508, but without counting data records at the beginning of these flow pathways.

The set of data records are ranked according to the number of times each data record is found in the list of pathways fp1 to fpn, ranking the data records from the most counts to the least at step 510. The highest ranked data record (highest data count in pathways) is assigned the rank of 1, the second highest a rank of 2, etc. These weights can also be normalized (using flow or maximum value) or weighed.

Flow ranking is best described with reference to an example. Consider the network shown previously with reference to FIG. 4, but with the direction of citation relationships shown. In the diagram M is a backward citation of L, and the direction of the arrow indicates the flow of knowledge transfer.

Referring now to FIG. 5, in this network, there are two entry data records M and C, and two exit data records E and I. From this we can define the following possible flow pathways, as outlined in Table 3.

TABLE 3

| Path | Data Records Appearing in Flow Paths, Including Exit (but not Entry) |
| --- | --- |
| M-L-A-E | L, A, E |
| M-L-A-I | L, A, I |
| C-B-A-I | B, A, I |
| C-B-A-E | B, A, E |

The number of times each data record appears in this list of flow records is counted, as shown in Table 4.

TABLE 4

| Data | Number of times it Appears in Shortest Flow Path |
| --- | --- |
| A | 4 |
| B | 2 |
| C | 0 |
| E | 2 |
| I | 2 |
| L | 2 |
| M | 0 |

Hence the data records can be ranked in order of importance as A most important, and B, E, I and L equally next important.

It will be understood that flow ranking and between-ness ranking may be combined using any suitable method. For example, the values derived from the two ranking methods may be averaged. For example, referring to Table 5, there is shown the average of each of the examples listed above and the final ranking of the data records based on an average of the two methods.

TABLE 5

| Data Records | Betweenness Ranking | Flow Ranking | Average of Rankings | Final Ranking |
| --- | --- | --- | --- | --- |
| A | 1 | 1 | 1 | 1 |
| B | 2= | 2= | 2 | 2= |
| L | 2= | 2= | 2 | 2= |
| E | 3= | 2= | 2.5 | 3= |
| I | 3= | 2= | 2.5 | 3= |
| C | 3= | 3= | 3 | 4= |
| M | 3= | 3= | 3 | 4= |

In an alternative embodiment, the final score was biased towards the flow ranking, with the flow ranking given three times the ranking of the betweenness ranking. This does not affect the ranking of this particular data set, but the average score for record E reduces slightly.

It is important to note that the combination of the two methodologies used to rank data records provides advantages over and above the utilisation of any single methodology. In particular, the two methodologies are focused on different structural features in the network. As such, using one methodology alone may make it difficult to compare two different networks with different structural features which would predispose the network to a higher/lower score. By combining both methodologies, such skews would be minimised or reduced by taking an average over a number of different methodologies.

Determine the Highest Ranking Set of Data Records in a Network of Data Records

In addition to determining the highest ranking individual data records, it is also important to be able to determine the highest ranking set of data records in a network of data records. This allows, for example, the direct quantitative comparison of different sets of data records, such as the comparison between different portfolios of patents, or in reference to scientific papers, papers published by the same institution or authored or co-authored by the same author.

The embodiment provides a methodology for quantitatively rank portfolios of data records in a particular area of technology.

Figure 6:
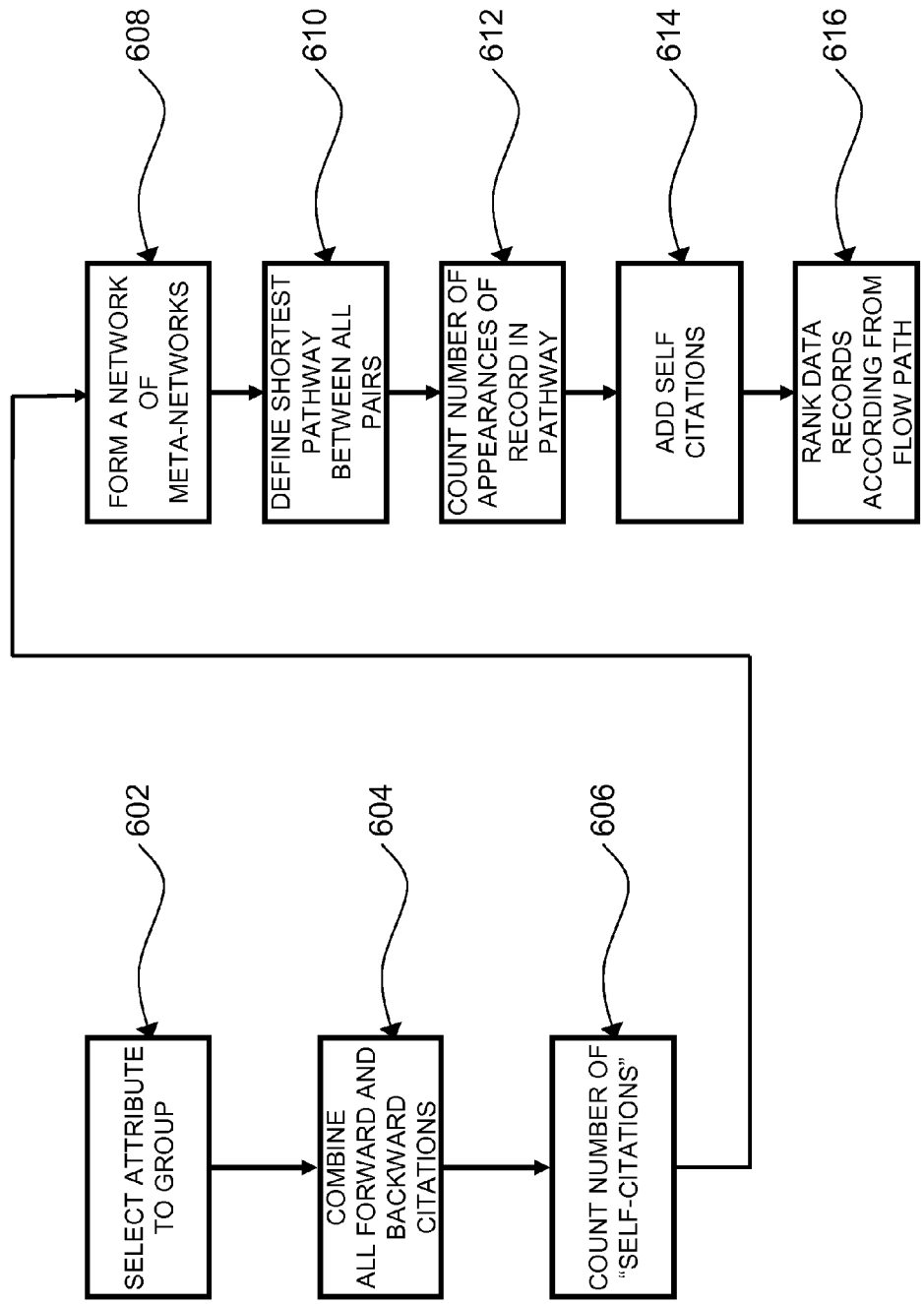
FIG. 6 is a flowchart depicting the process flow of another method in accordance with an embodiment of the present invention.

The embodiment described herein with reference to FIG. 6 provides a process for ranking groups of related data records in a network or cluster of inter-connected data records by firstly selecting a group of data records to be analysed in the network or cluster of data records using any suitable method, such as the methods previously described in the present specification.

Once a group of data records has been selected, an attribute which is used to group data records (in the case of patents, this might be common ownership as just one example) is determined at step 602. Thereafter, the different groups are ranked according to a chosen attribute according to the following methodology.

At step 604, for each group of data records formed according to step B) hereafter referred to as a 'meta data record'), combine all of the known forward and backward citations from the data records into new data records m1, m2 to mn.

At step 606, where there are citation links between two or more data records belonging to the same meta data record, make a record of this, and count the number of 'self-citations'.

At step 608, form a network of these meta-records m1, m2 to mn using the citation records collected in each meta-records and provide a value C2 for each link by counting the number of citations between each pair of meta-records.

At step 610, for a set of data records m1 to mn, define the shortest pathway between any all pairs of these meta data records, and compile a list of these pathways mpw1, mpw2 ... mpwn.

At step 612, count the number of times each meta data record appears in the list of pathways mpw1 to mpwn, but not counting data records when they appear at the beginning and end of these pathways.

At step 614, add the self citations to the count that each meta data record appears in the meta flow pathways to come up with a final meta data record flow path ranking.

At step 616, rank the set of meta data records according to the final meta data record flow path ranking, ranking the data records from the most counts to the least. The highest ranked meta data record (highest data count in pathways) is assigned the rank of 1, the second highest a rank of 2, etc.

Figure 7:
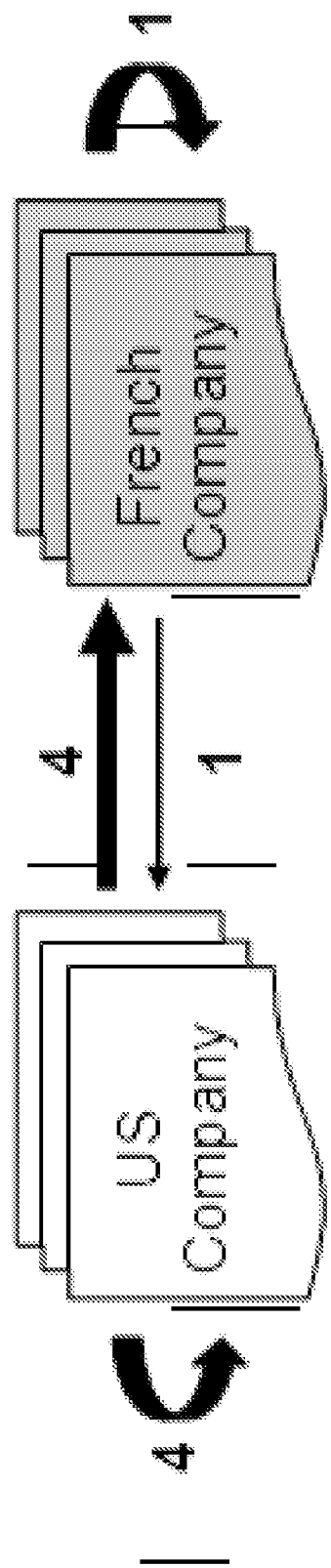
FIG. 7 is an example network illustrating the application of the method in accordance with the process flow of FIG. 6.

This methodology is best described by reference to an example utilising a particular network which contains data records where it was shown that all listed data records belonged to two companies, which, for the purpose of this example, are the only two Applicants/Patentees for all patent applications/patents in a particular technology area (see Table 6). For ease of understanding, we have referred to these two companies as 'US Company' and 'French company'. The links between these data records are shown in FIG. 7.

TABLE 6

| Data Record | Data Record Owner | Backward Citation | Forward Citation |
|---|---|---|---|
| A | US company | D | C, E |
| B | US company | E | C |
| C | US company | A, B, D | E, F |
| D | US company | — | A, C, F |
| E | French company | A, C | B, F |
| F | French company | C, D, E | — |

The data records were combined to arrive at Table 7.

TABLE 7

| Company | Data Records Belonging to Company | Citation Relations to Other Companies When Data Records Combined | Self Citations When Data Records Combined |
|---|---|---|---|
| US Company | A, B, C, D | A-E, C-E, C-F, D-F, E-B (5) | D-A, B-C, A-C, D-C (4) |
| French Company | E, F | As Above (5) | E-F (1) |

These links can then be easily displayed, as shown in FIG. 7.

In FIG. 7, an arrow between each node (each node representing a patent Applicant or Patentee) represents one or several citation relationships, and an arrow that returns on itself represents a self citation. A network of similar Applicants and/or Patentees can be built and analysed, using any suitable network quantification method, to determine the relative strength of the meta data records in the set.

In an embodiment, only the citations for data records that meet certain criteria are included. For example, the selection of citations may be limited to citations from data records where the data records meet certain criteria, such as prescribed values of one or more attributes. In the case of patent data records, for example, citations from data records for patents that are 'live' (i.e. current patent applications or granted patent records which are in force) are included, but records related to dead patents (i.e. patent that have been abandoned, are lapsed or ceased) are not included. This would allow the direct comparison of the strength of two competing patent portfolios in terms of litigation. In contrast, if available patents were included, two competing patent portfolios could be compared in terms of inventive quality.

Determining Whether Data Records should be Associated in the Absence of a Direct Link and/or Determining Attributes Should be Assumed for a Given Data Record in the Absence of the Attribute The embodiment described herein provides a methodology for determining data records that are likely to be associated with other data records in a data set, irrespective of whether the data records share a common attribute value. This methodology is particularly useful for situations where data sets are incomplete. For example, to utilise patent data as an example, it is sometimes known for patent data related to recently published patent applications to be incomplete (e.g. there may be no citation information available for just published patent applications).

The methodology described below provides a methodology to minimise such shortcomings in the data records to provide the end user with a network analysis that provides meaningful information. As with previous examples, it is assumed that a network of data records has already been formed, and that any desired processing (i.e. the application of methodologies to cluster individual or groups of data records has already been applied, where desired, to create an appropriately linked data set.

Utilising a linked data set, a data record within this network of interest to a user is selected (DR). Thereafter, one of two possible methodologies may be applied.

Shortest Path Length

Figure 8:
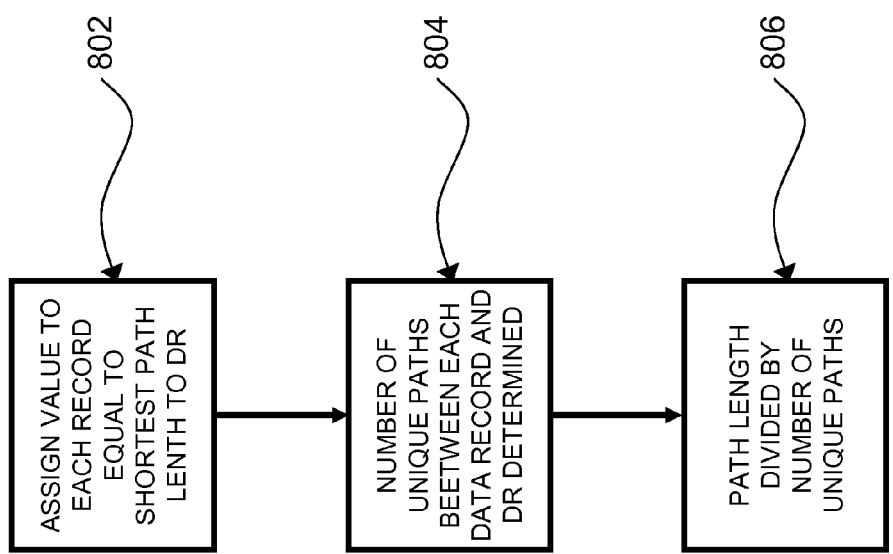
FIG. 8 is a flowchart depicting the process flow of another method in accordance with an embodiment of the present invention.

Referring to FIG. 8, at step 802 a value is assigned to each data record equal to the length of the shortest path length between the data record and DR: "PL".

At step 804, for each data record, the number of unique paths between each data record and DR at the defined PL, PL(n) is determined (i.e. if there are two different routes at the same path length PL, the PL(n) value is 2).

At step 806, the quantity PL is divided by PL(n) to determine PLdiv. The data records in the network are then ranked according to PLdiv, with the data records ranked from the lowest value of PLdiv to the highest. Higher ranked data records are more likely to be similar to DR than lower ranked data records.

Figure 9:
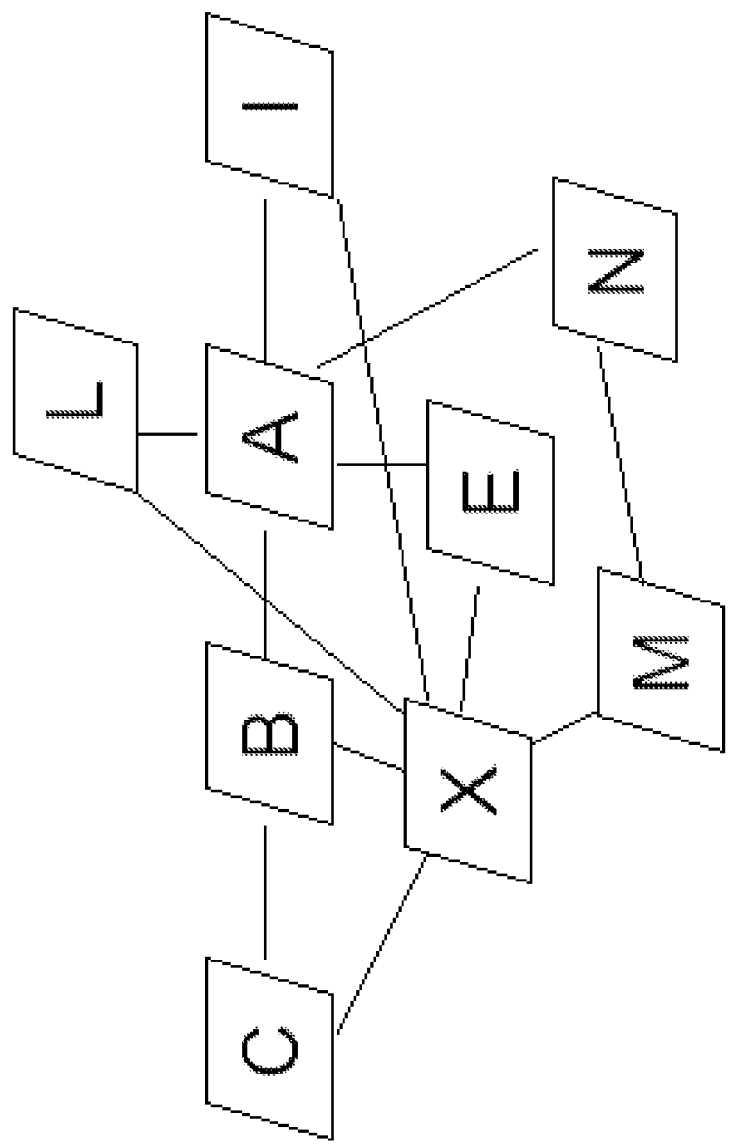
FIG. 9 is an example network illustrating the application of the method in accordance with the process flow of FIG. 8.

This is best illustrated by reference to an example, as shown with reference to FIG. 9. In the example, the data record of interest is A (i.e. A=DR). There is no direct relationship between data record A and X, and a simple search might not show that X may be similar to A. However data records A and X share four C2 type relationships (via data records B, E, L and I). Hence the PLdiv value of the relationship between A and X is 2 (shortest possible path length) divided by 4 (number of C2 paths)=0.5, where a lower number suggests a greater likelihood of two patents being similar.

This approach is used to identify potential commonalties where data such as direct citation relationships are missing, rather than relying on direct citations. If it was to qualify existing links, the result above would suggest a stronger relationship between A and X than between A and L, which are directly connected but where there are no C2 type relationships. While initially counter-intuitive, this result may be believable. The fact that A and X are joined by four (4) C2 relationships suggests that they may have more in common than the lack of a direct relationship may suggest. This is particularly the case in data sets where direct relationships are subjectively assigned (or subjectively not assigned) and there may be an error in the selection of these individual relationships.

For example, in patent data, citation relationships are most often manually assigned by an examiner. As there are hundreds of examiners each with a different level of skill, ability, experience, background knowledge and work ethic, then citation information can be highly variable in reliability from one patent to another. Two patent examiners looking at the same patent application may for a range of reasons select different prior art citations. For this reason, looking for similarities between patents using indirect citations as well as direct citations can help compensate for the effect of errors in assigning direct citations.

Highest MCount Embodiment

An alternative approach is to use the MCount embodiment. The first step in utilising the MCount embodiment is to determine the Mcount value (as previously described herein) between the DR and every other data record. The data records are then ranked in the network according to the Mcount value for each record, with the data records ranked from the highest value of Mcount to the lowest. Higher ranked data records are more likely to be similar to DR than lower ranked data records.

Figure 10:
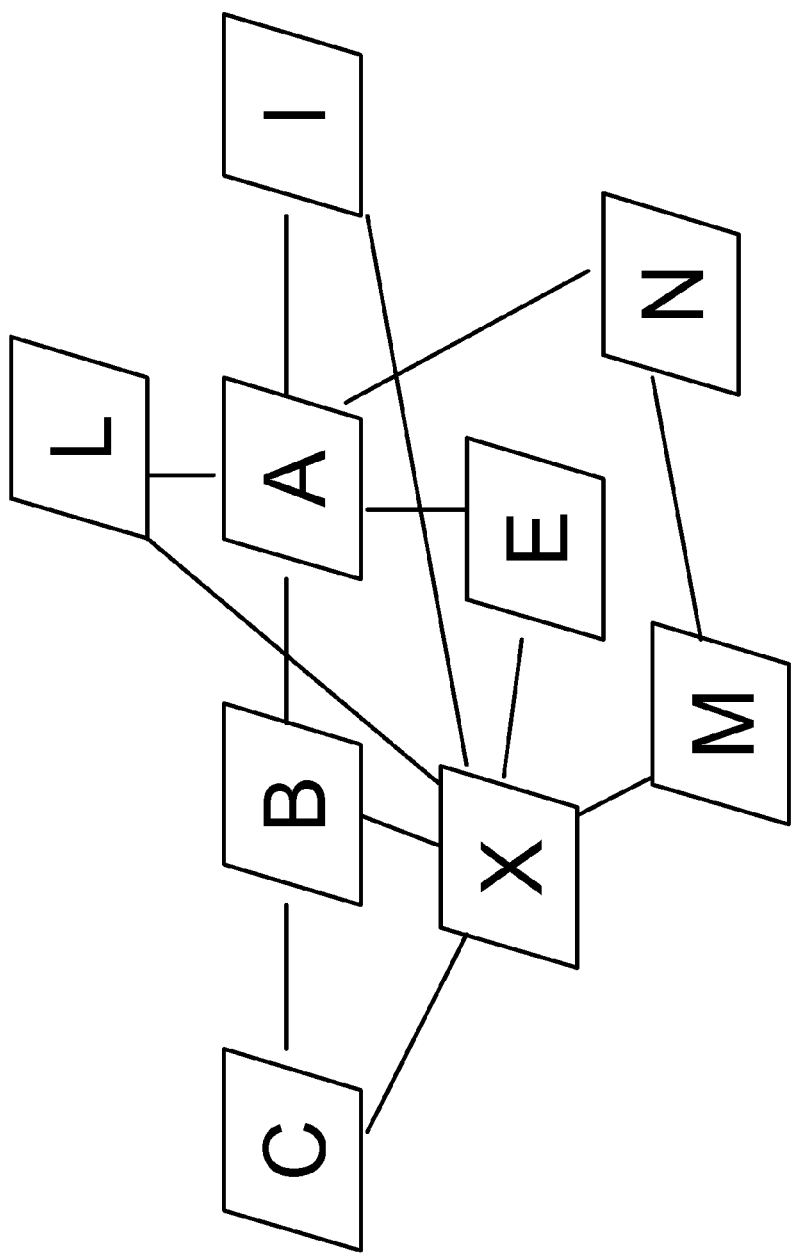
FIG. 10 is an example network illustrating the application of a method in accordance with an embodiment of the invention.

Again, this can be illustrated with reference to a simple example, as shown in FIG. 10. An assumed value for M is used in the Mcount algorithm, with reference to FIG. 10 and Table 8, it is shown that the final Mcount value is 2.33.

TABLE 8

| Degree of Separation | Number of Shortest Paths Between A and X | M Value | Mcount Contributor |
|---|---|---|---|
| 1 | 0 | 1 | 0 |
| 2 | 4 | 0.5 | 2 |
| 3 | 1 | 0.33 | 0.33 |

Again, a higher number suggests a greater similarity between two patents. As with the previous methodology (i.e. the Shortest Path Length), it is shown that there is a stronger relationship between A and X than between A and L, which are directly connected but where the Mcount score only comes to 1.99 (See Table 9).

TABLE 9

| Degree of Separation | Number of Shortest Paths Between A and L | M Value | Mcount Contributor |
|---|---|---|---|
| 1 | 1 | 1 | 1 |
| 2 | 0 | 0.5 | 0 |
| 3 | 3 | 0.33 | 0.99 |

Note though that there is no C3 type relation running from X to C to B to A as this is not the shortest link between X and A that incorporates B.

Prior Art or Licensee Focus Embodiment

In another embodiment, the ranked data records as determined by either the shortest path length and or Mcount embodiment are formed into two or more groups according to the value of one or more attributes of the data records. For example, patent data records can be formed into patents that were filed or had priority dates earlier than that of the DR patent (prior art) and patents that have priority dates later than that of the DR patent that comprises DR (potential licensees). Similarly, a search for potential licensees might be restricted to patents filed by companies which were thought to be applying the technology in question. This can be used, for example, to help identify earlier patents that might be prior art patents, even in the absence of direct citation links. The same would apply in reverse to later patents that might suggest other companies that might potentially be infringing on the subject patents.

Similarity Embodiment

In yet another embodiment, the attributes of the data records that are found to be most similar to a DR are used to predict any missing values of the attributes of the DR. For example, attributes may be abundant such as ICT class, or priority dates, or scarce such as the economic value of a patent. Even if the attribute in question is known for only some of all data records, such attributes provide an initial data point for the prediction of the attribute values for the remaining data records.

Figure 11:
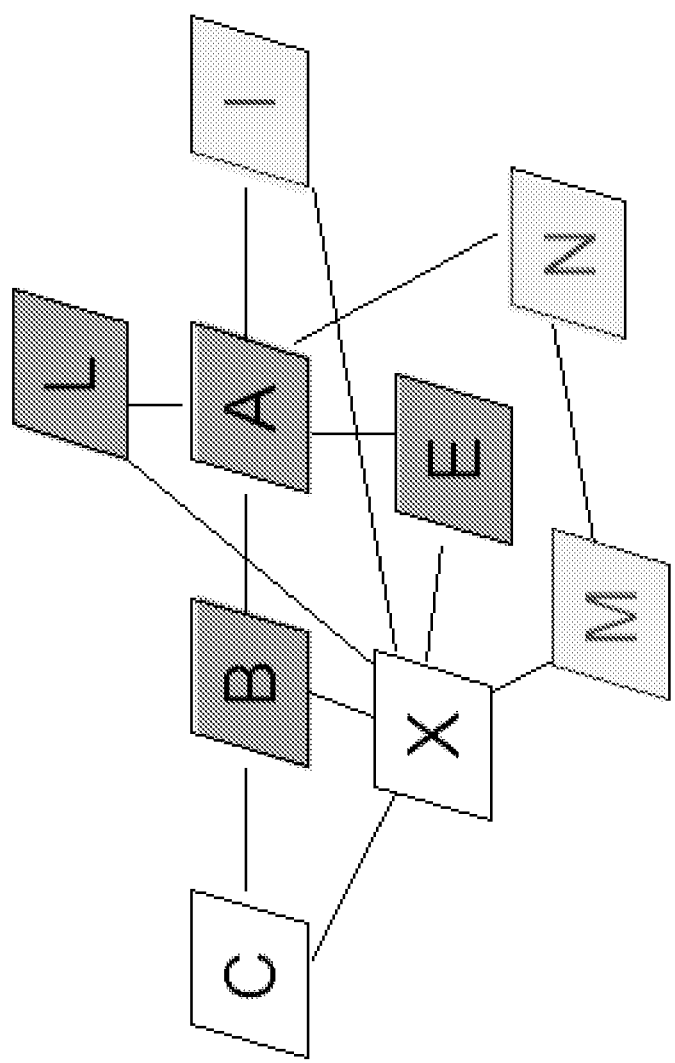
FIG. 11 is an example network illustrating the application of a method in accordance with an embodiment of the invention.

An example of previous methodology is illustrated with reference to FIG. 11, where we are attempting to determine the attribute, in this case colour of data record X based on the Mcount value of its relationships with patents that it is directly or indirectly linked to FIG. 11 shows the original state D.

TABLE 10

| Data Record | Mcount Relationship with Data Record X (Using M values of 1, .5, 0.33, 0.25) | Final Mcount Score (Higher is Closer) |
|---|---|---|
| A | 4 * 0.5 + 1 * 0.33 | 2.33 |
| I | 1 * 1 + 3 * 0.33 | 2.25 |
| E | 1 * 1 + 1 * 0.5 + 2 * 0.33 | 2.16 |
| L | 1 * 1 + 3 * 0.33 | 2 |
| B | 1 * 1 + 1 * 0.5 + 1 * 0.33 | 1.83 |
| C | 1 * 1 + 1 * 0.5 | 1.5 |
| M | 1 * 1 + 1 * 0.25 | 1.25 |
| N | 1 * 0.5 + 1 * 0.33 | 0.83 |

$X$ being dark grey: $2.33(A)+2.16(E)+2(L)+1.83(B)=8.32$ $X$ being light grey: $2.25(I)+1.25(M)+0.83(N)=4.33$ X being any other colour: 1.5 (C)

This analysis predicts that X is almost twice as likely to be dark grey than light grey. X is 5.5 times more likely to be dark grey than any other colour.

Figure 12:
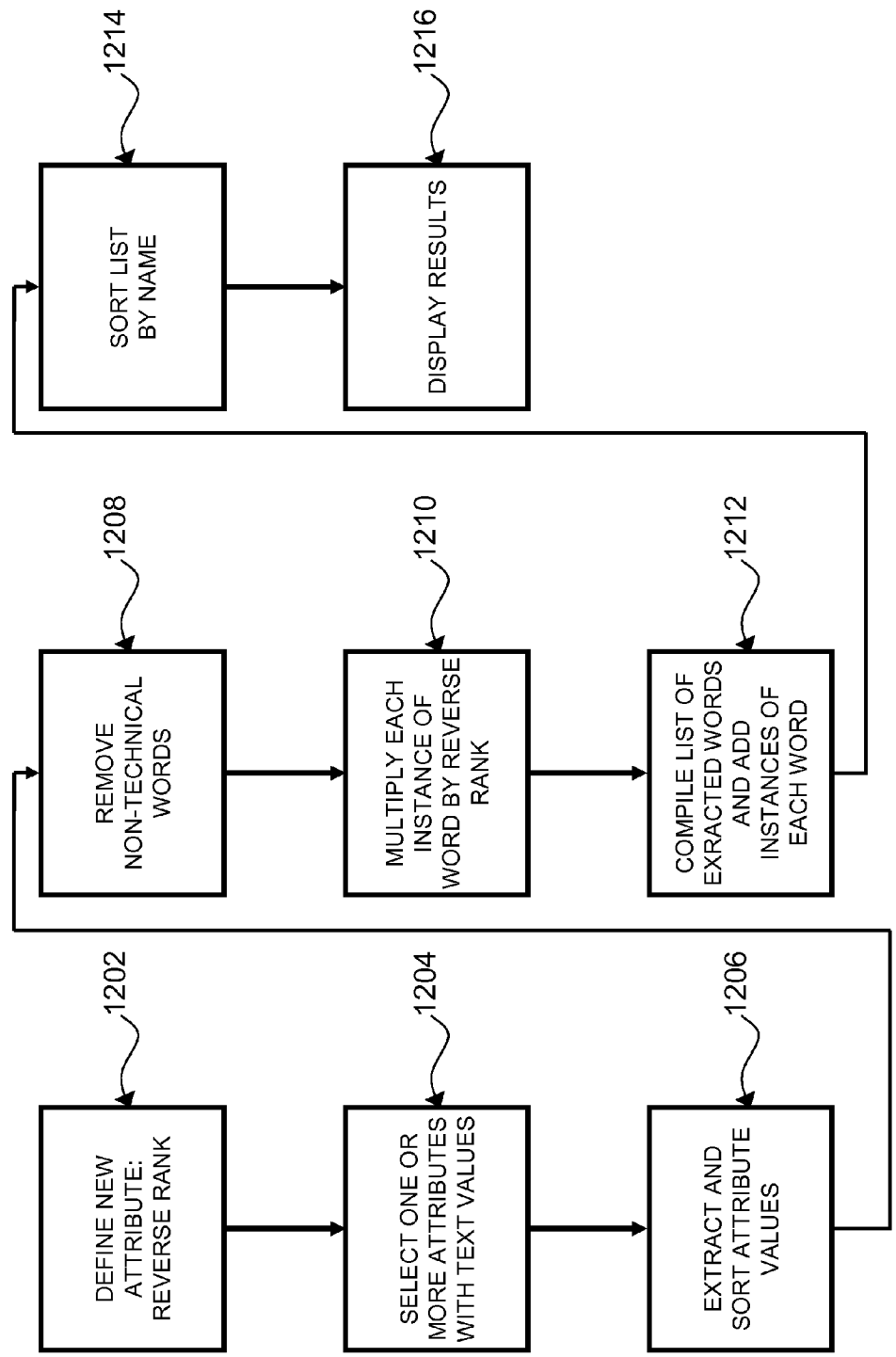
FIG. 12 is a flowchart depicting the process flow of another method in accordance with an embodiment of the present invention.

Automatically Determining and Displaying the Subject Matter of any Group of Networked Data Records which have Been Ranked The system described herein also provides a methodology for determining the subject matter of a set of ranked data records in a network of inter-connected data records comprising the steps outlined with reference to FIG. 12:

At step 1202, provide each record in the group of data records with a new attribute 'reverse rank', in which the highest rank data record is assigned the value equal to the number of data records in set, the second highest a value to the number of record minus 2, and so on.

At step 1204, for the set of ranked data record, select one or more attributes that contain text, and where the text helps to describe the subject matter of the invention At step 1206, for each data record in this set, extract and sort the words in the selected attributes using the following sub-steps.

At step 1208, optionally remove the common and non-technical words, such as 'the,' and etc, where the common words are found in list provided to the method.

At step 1210, for each word extracted, multiply each instance of the word by the reverse rank of the data record the word was extracted from.

At step 1212, compile a list of extracted word, and add up the instances of use for each words multiplied by the reverse rank of the data record that the word was extracted from, to end up with a score for each word.

At step 1214, sort the list the extracted words from the most highest score to the lowest.

At step 1216, show the highest ranked word in a visualisation of the data networks, or in any suitable means of displaying the highest ranked words.

At step 1218, other text based attributes can be analysed in the same way, i.e. the owners of patent data records, or the employer of published academic paper records, so as to determine the dominant patent owner or academic employer, or so on.

This process shown at FIG. 12 is illustrated with reference to the example described with reference to Table 11, which utilised a network ranking system to the following patent titles in the order listed in Table 11.

TABLE 11

| Ranking | Reverse Ranking | Data Record Title |
|---|---|---|
| 1 | 5 | Sports-mud car seat covers |
| 2 | 4 | Rubber cap for car door corners-protection |
| 3 | 3 | A means for charging electric car batteries |
| 4 | 2 | Ezypark car turntable |
| 5 | 1 | Car accessory-umbrella holder |

Ignoring non-technical words, the use of the reverse ranking system lead to the keyword count displayed at Table 12. This shows the subject matter of the ranked patents was more likely to be related to cars in some way.

TABLE 12

| Word | Word Score |
|---|---|
| car | 15 |
| Sports | 5 |
| mud | 5 |
| seat | 5 |
| covers | 5 |
| rubber | 4 |
| cap | 4 |
| door | 4 |
| corners | 4 |
| protection | 4 |
| charging | 3 |
| electric | 3 |
| batters | 3 |
| Ezypark | 2 |
| turntable | 2 |
| accessory | 1 |
| umbrella | 1 |
| holder | 1 |

Figure 13:
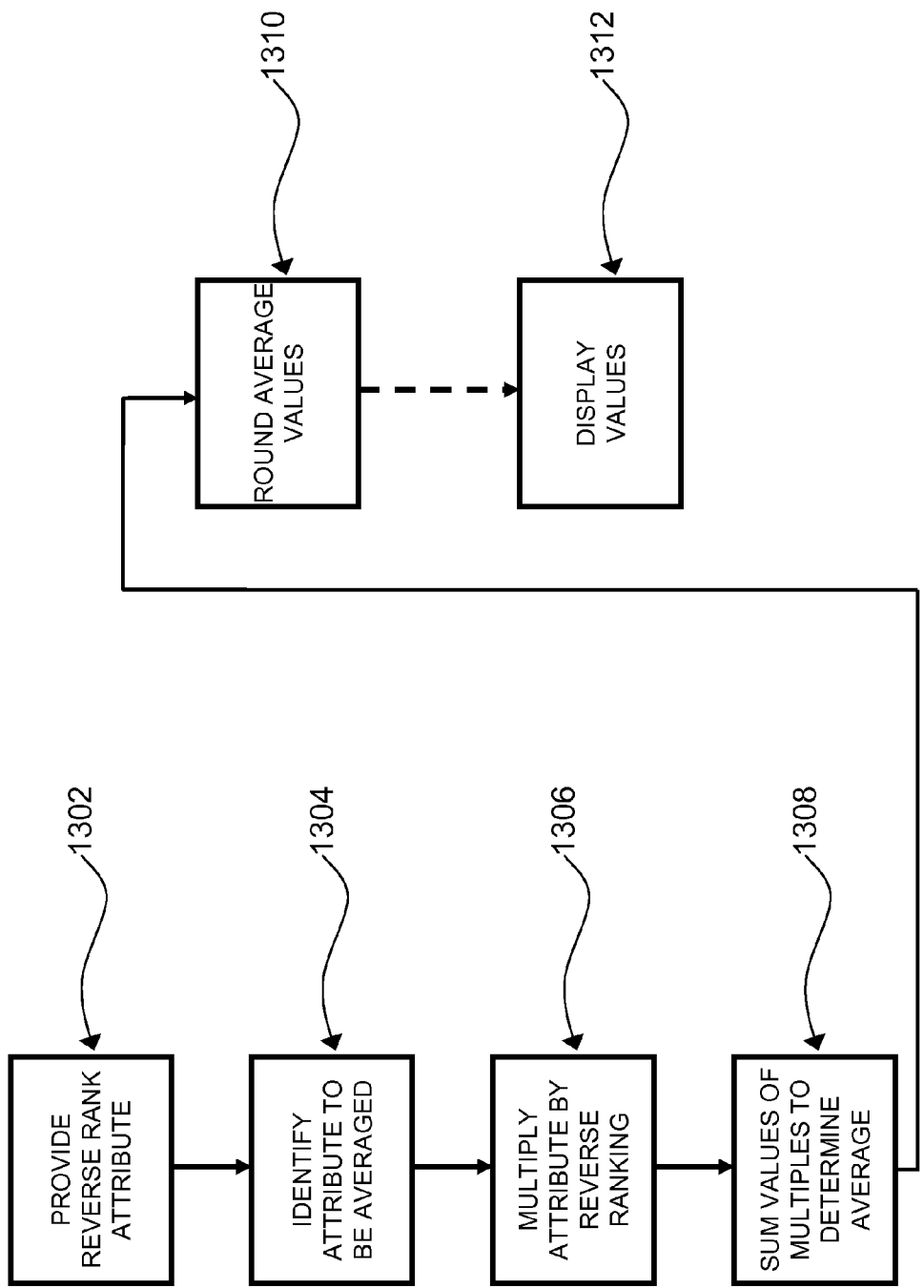
FIGS. 13 and 14 are flowcharts depicting processes according to an embodiment of the present invention.

Automatically Determining and Displaying the Weighted Average Value of any Selected Attribute of any Group of Networked Data Records which have been Ranked The embodiment also provides a process for determining the median year of a set of ranked data records in a network of inter-connected data records comprising the steps outlined in the flowchart of FIG. 13.

At step 1302, provide each record in the group of data records with a new attribute 'reverse rank', in which the highest rank data record is assigned the value equal to the number of data records in set, the second highest a value to the number of record minus 2, and so on.

At step 1304, for each data record, identify an attribute to be averaged (say filing year of a patent), and where this attribute is an ordinary number.

At step 1306, for each data record in this set, multiply the value of the selected attribute by the reverse ranking.

At step 1308, sum the values of the multiples determined in Step C, and divide the sum by the sum of the reverse ranks to determine the weighted average of the attribute.

At step 1310, optionally round up or down the calculated weighted average, or perform any other desired transformation.

At step 1312, show the weighted average attribute in a visualisation of the data networks, or in any suitable means of displaying the highest ranked attributes (say filing years of a patent).

This methodology is illustrated with reference to the example given below, where a network data record ranking system ranks five data records in the following order. Each data record has a year value as part of its attributes.

TABLE 13

| Ranking of Data Record | Data Record | Year of Data Record |
|---|---|---|
| 1 | A | 2009 |
| 2 | B | 2005 |
| 3 | C | 1984 |
| 4 | D | 1992 |
| 5 | E | 1999 |

The average of these year values is 1998, but it might be better if the representative year was biased towards the highest ranked data records.

TABLE 14

| Ranking of Data Records | Name of Data Record | Reverse Ranking | Year of Data Record | Reverse Ranking *Year |
|---|---|---|---|---|
| 1 | A | 5 | 2009 | 10045 |
| 2 | B | 4 | 2005 | 8020 |
| 3 | C | 3 | 1984 | 5952 |
| 4 | D | 2 | 1992 | 3984 |
| 5 | E | 1 | 1999 | 1999 |
| Sum | | 15 | | 30000 |

By dividing the sum of the last column by the sum of the reverse ranking, a weighted average of the year 2000 is calculated (30000 divided by 15), as opposed to the 1998 figure for a non-weighted average.

Figure 14:
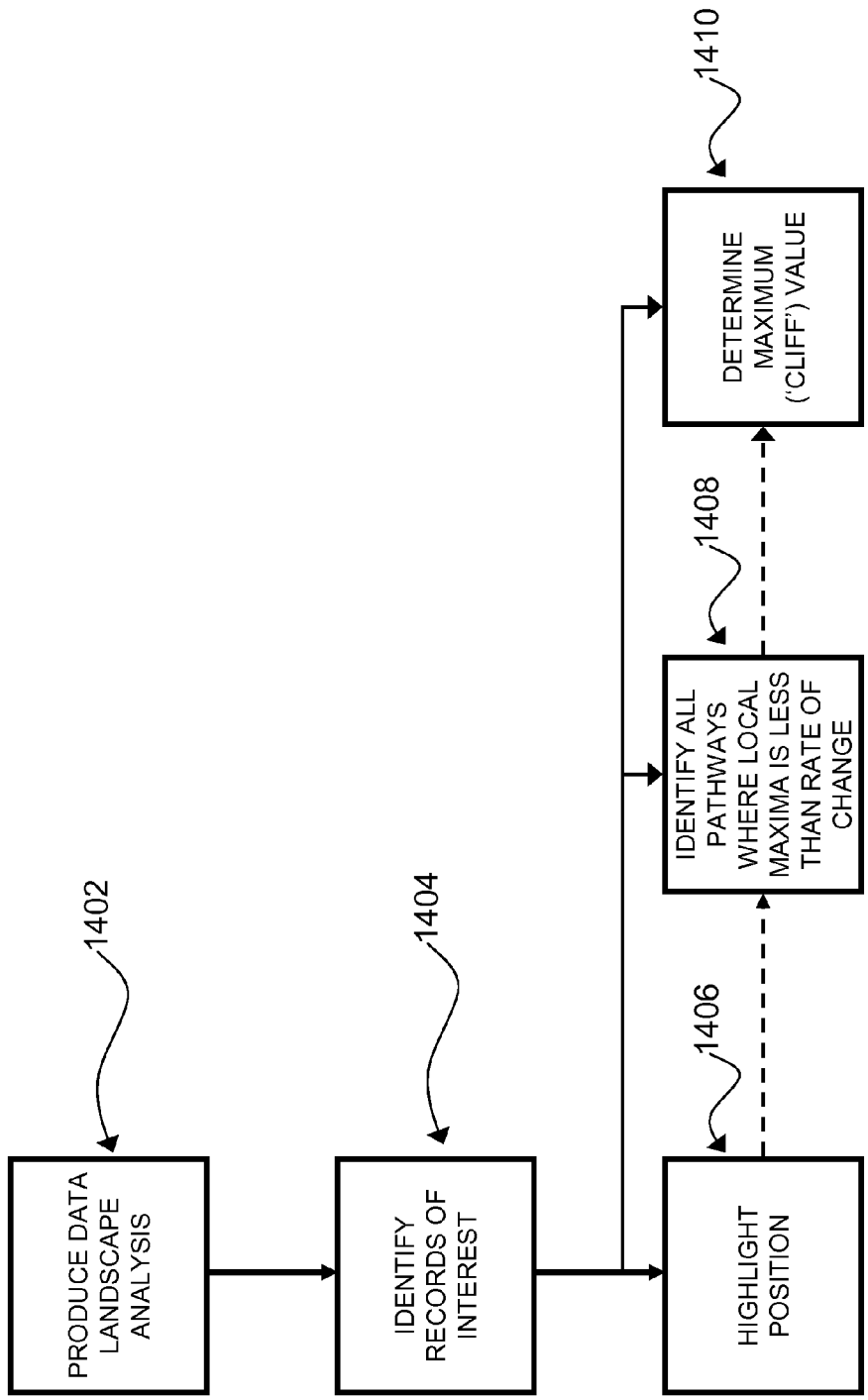

Providing a Visual Indication of the Relative Performance of Any Sub-Group of Data Records in a Data Network Analysis The embodiment also provides a process to provide a visual indication of the relative performance of any sub-group of data records in a data network analysis comprising the steps outlined in FIG. 14.

At step 1402, use any suitable data landscape method or methods to produce a data landscape analysis which includes the preparation of a data record network, including a visualisation of this analysis (see FIG. 1).

At step 1404, one or more data records are identified ("data records of interest") which have one or more attributes or values of attributes that makes them of particular interest to the end user. These data records may or may not have been used in the process used to create the data landscape analysis. As an example, a user might be particularly interested in patent records filed by Australian companies, so that the user can understand how Australian patent Applicants compare to those from the rest of the world.

At step 1406, 1408 and 1410, for each record of interest, the following methods are used to determine where they would sit in the data landscape analysis and visualisation.

At step 1406, if the data records of interest are in the network initially created highlight their position, for example by marking them in a distinctive colour or similar. If not, proceed to step 1408.

At step 1408, determine if there are any citation links between the data records of interest and one or more of the data records in the network. Use these citation links as the basis for determining a probable location. If there are no citation links, proceed to step 1410.

At step 1410, use any suitable data matching system to identify the data record or records within the network that are closest to the data records of interest. Such a data matching system might be based on one or more attributes within the data records, for example in the case of patents, that can be a common IPC classification, inventor, keywords etc.

Figure 15:
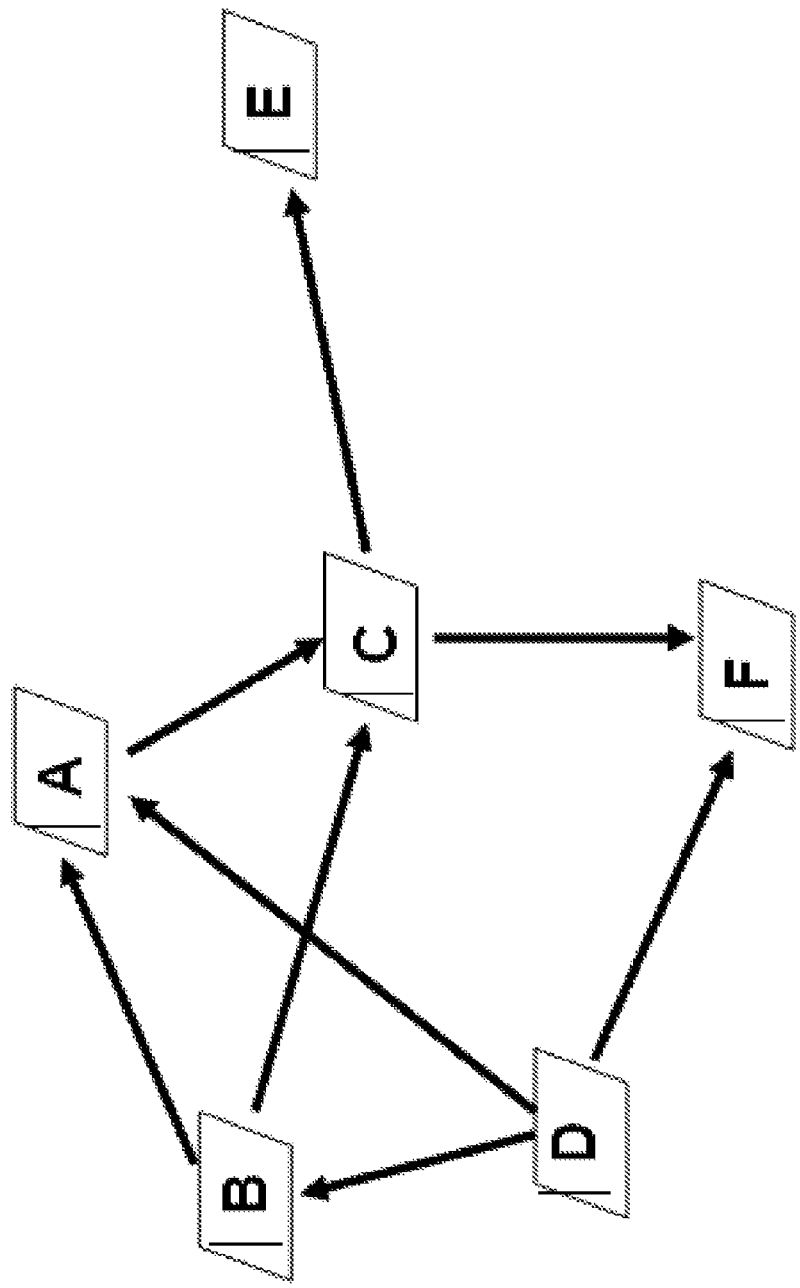
FIGS. 15 and 16 are network maps illustrating examples of the applications of embodiments of the present invention.
Figure 16:
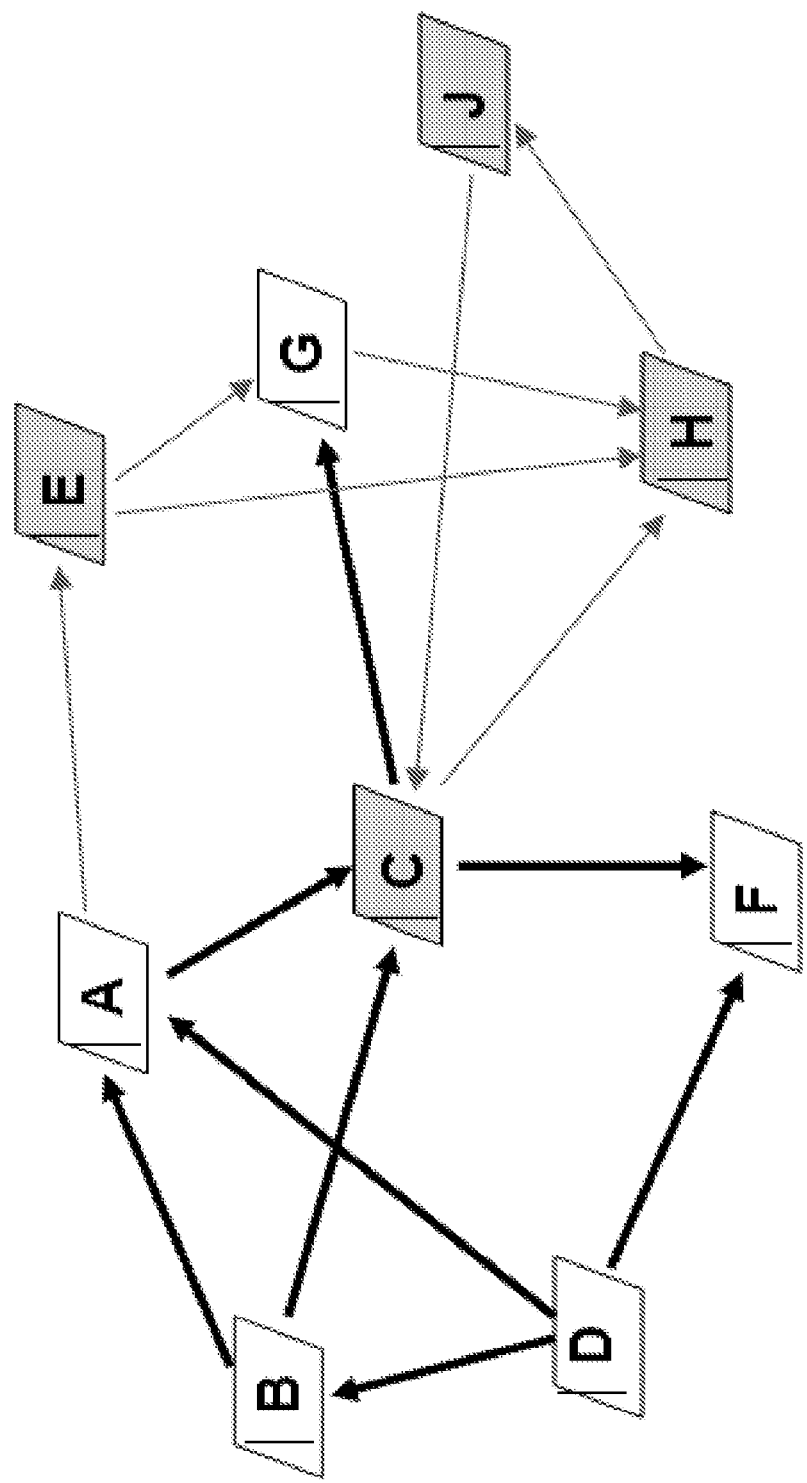

This methodology is illustrated with reference to FIGS. 15 and 16. Consider the network map shown at FIG. 15.

This network was formed as part of a process that reduced the number of data records shown to focus on the key data records (say using some of the inventions previously discussed). C turns out to have the attribute of being an Australian data record. Three additional "Australian" data records, G, H and J did not survive the earlier culling process, but for the purpose of this example, there is particular interest in Australian data records. Consider the network map shown at FIG. 16, where Australian data records are indicated by having a grey colour. In this example these missing Australian data records G, H and J are located and put into the network, along with their citation relationships which are added to complete the map.

To determine the likelihood of additional missing links between any of the data records, and suggest such links, PLdiv score described earlier is utilised to predict attributes that might be missing for some of the data records, for example the ICT class or the economic value of a data records, The same PLdiv score may be utilised.

It will be understood that while the embodiments described herein have been described with reference to the analysis of patent data, the embodiments and the broader invention described and claimed herein are not limited to analysing patents. Other embodiments of the invention may find use in the collation and preparation of data in relation to trade marks, scientific publications, websites, and court judgments. For example, some trade mark records can refer to earlier trade marks that the examiner thought may be relevant to the mark being examined, scientific papers can refer to earlier scientific papers that are relevant to the paper, and Court judgments can refer to earlier court judgments that covered similar areas of law.

Variations and Modifications to the Embodiments Described Herein

Although not required, the embodiments described with reference to the Figures can be implemented as an Application Programming Interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the described embodiments and the broader invention are either wholly implemented by computing system or partly implemented by computing systems, then any appropriate computing system architecture may be utilized. This includes stand alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for identifying clusters within a network including a plurality of nodes and links, comprising the steps of:
   determining a link value for each node in the network, with each node being characterized such that it does not require the sharing of an attribute value to be clustered;
   determining a local maxima within the network by locating node values where the sum of link values are higher than the sum of link values for all adjacent nodes;
   determining a list of the shortest pathways between a local maximum and all other nodes in the network, wherein a pathway embodies a rate of change of link values and is able to traverse a plurality of linked nodes;
   collapsing the pathways in accordance with a predetermined algorithm; and
   associating all nodes that remain connected to each local maximum along the pathways.

2. A method in accordance with claim 1, wherein the link value is derived by determining the number of second degree of separation links between each node and each other node.

3. A method in accordance with claim 1, wherein the predetermined algorithm collapses the pathways where the rate of change of link values is greater than a predetermined value.

4. A method in accordance with claim 1, wherein the predetermined algorithm collapses the pathways where the link value is smaller than a predetermined value.

5. A method for identifying clusters in accordance with claim 1, wherein the relative ranking of the nodes is determined by:
   determining the shortest pathway between each of the nodes;
   determining the number of times each of the nodes appears in this list of the shortest pathways; and
   assigning a ranking to each of the nodes based on the number of times the node appears in the list of shortest pathways.

6. A computer program product comprising at least one non-transitory computer-readable storage medium having computer-readable program code portions stored therein, the computer-readable program code portions comprising:
   an executable portion configured to determine a link value for each node in the network, with each node being characterized such that it does not require the sharing of an attribute value to be clustered;
   an executable portion configured to determining a local maxima within the network by locating node values where the sum of link values are higher than the sum of link values for all adjacent nodes;
   an executable portion configured to determining a list of the shortest pathways between a local maximum and all other nodes in the network, wherein a pathway embodies a rate of change of link values and is able to traverse a plurality of linked nodes;
   an executable portion configured to collapsing the pathways in accordance with a predetermined algorithm; and
   an executable portion configured to associating all nodes that remain connected to each local maximum along the pathways.

7. A method for determining the probability of a data record being associated with another data record, comprising the steps of
   determining the length of the shortest pathway value and the number of unique pathways of the shortest length between the two data records, wherein a pathway embodies a rate of change of link values and is able to traverse a plurality of linked data records;

dividing the shortest pathway length by the number of unique pathways to determine a pathway value, wherein the pathway value is an indicator of the similarity between the selected data record and the at least one other data record.

8. A system for identifying clusters within a network including a plurality of nodes and links, comprising:

a processor arranged to determine a link value for each node in the network, with each node being characterized such that it does not require the sharing of an attribute value to be clustered;

determine a local maxima within the network by locating node values where the sum of link values are higher than the sum of link values for all adjacent nodes;

determine a list of the shortest pathways between a local maximum and all other nodes in the network, wherein a pathway embodies a rate of change of link values and is able to traverse a plurality of linked nodes;

collapse the pathways in accordance with a predetermined algorithm; and associate all nodes that remain connected to each local maximum along the pathways.

9. A system in accordance with claim 8, wherein the link value is derived by determining the number of second degree of separation links between each node and each other node.

10. A system in accordance with claim 8, wherein the predetermined algorithm collapses the pathways where the rate of change of link values is greater than a predetermined value.

11. A system in accordance with claim 8, wherein the predetermined algorithm collapses the pathways where the link value is smaller than a predetermined value.

12. A system for identifying clusters in accordance with claim 8, wherein the relative ranking of the nodes is determined by:

determine the shortest pathway between each of the nodes;

determine the number of times each of the nodes appears in this list of the shortest pathways; and assign a ranking to each of the nodes based on the number of times the record appears in the list of shortest pathways.

13. A system for determining the probability of a data record being associated with another data record, comprising:

a processor arranged to determine the length of the shortest pathway value and the number of unique pathways of the shortest length between the two data records, wherein a pathway embodies a rate of change of link values and is able to traverse a plurality of linked data records; and divide the shortest pathway length by the number of unique pathways to determine a pathway value, wherein the pathway value is an indicator of the similarity between the selected data record and the at least one other data record.

* * * * *